(12) United States Patent
Johnson et al.

(10) Patent No.: US 9,760,124 B1
(45) Date of Patent: Sep. 12, 2017

(54) ORGANIC LIGHT EMITTING DIODE ("OLED")-BASED DISPLAYS

(71) Applicant: Bank of America Corporation, Charlotte, NC (US)

(72) Inventors: Julie Kisselburg Johnson, Phoenix, AZ (US); James M. Heddleson, Charlotte, NC (US); Monika V. Kapur, Jacksonville, FL (US); William P. Jacobson, Matthews, NC (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 15/206,358

(22) Filed: Jul. 11, 2016

(51) Int. Cl.
| G06K 7/10 | (2006.01) |
|---|---|
| G06F 1/16 | (2006.01) |
| G06K 9/22 | (2006.01) |
| G09G 3/3208 | (2016.01) |
| G06K 9/00 | (2006.01) |
| G06K 19/04 | (2006.01) |

(52) U.S. Cl.
CPC ....... *G06F 1/1641* (2013.01); *G06K 9/00013* (2013.01); *G06K 9/222* (2013.01); *G06K 19/045* (2013.01); *G09G 3/3208* (2013.01); G09G 2354/00 (2013.01)

(58) Field of Classification Search
CPC .... G06F 1/1641; G06F 1/1652; G06F 3/0488; G06F 3/04883; G06K 9/222; G09G 3/3208; G09G 2354/00; G09G 2358/00
See application file for complete search history.

(56) References Cited

U.S. PATENT DOCUMENTS

| 3,703,864 A | 11/1972 | Bradford |
|---|---|---|
| 3,946,206 A | 3/1976 | Darjany |

(Continued)

FOREIGN PATENT DOCUMENTS

| DE | 102009028991 | 8/2009 |
|---|---|---|
| EP | 0827066 | 7/1997 |
| WO | WO2013131153 | 4/2012 |

OTHER PUBLICATIONS

Conor Gaffey, "World's Smallest Nano Chip will Double Processing Power of Smartphones," Jun. 9, 2015.

(Continued)

*Primary Examiner* — Thien M Le
*Assistant Examiner* — April Taylor
(74) *Attorney, Agent, or Firm* — Weiss & Arons LLP; Michael A. Springs, Esq.

(57) ABSTRACT

Method and apparatus for OLED-based displays are provided. Methods may include receiving card identification from a contactless communications chip at an OLED-based foldable display. Methods may include receiving a handwritten signature at a pressure-sensitive portion on the display. Methods may include transmitting the card identification information to a secure entity hub. Methods may include receiving a packet from the secure entity hub. The packet may include the identification number, an acceptance of the handwritten signature and card blank information. Methods may include activating a card blank attached to the display with card blank information. Methods may include transmitting a second packet to the secure entity hub comprising the identification number and a message that the card blank has been activated.

20 Claims, 19 Drawing Sheets

(56) References Cited

U.S. PATENT DOCUMENTS

| | | | |
|---|---|---|---|
| 4,968,873 A | 11/1990 | Dethloff et al. | |
| 5,313,051 A * | 5/1994 | Brigida | G06F 3/0488 235/375 |
| 5,693,956 A | 12/1997 | Shi et al. | |
| 5,734,154 A | 3/1998 | Jachimowicz et al. | |
| 5,770,849 A | 6/1998 | Novis et al. | |
| 6,015,092 A | 1/2000 | Postlewaite et al. | |
| 6,173,899 B1 | 1/2001 | Rozin | |
| 6,394,343 B1 | 5/2002 | Berg et al. | |
| 6,724,103 B2 | 4/2004 | Parrault | |
| 7,025,277 B2 | 4/2006 | Forrest et al. | |
| 7,270,276 B2 | 9/2007 | Vayssiere | |
| 7,360,682 B2 | 4/2008 | Shane et al. | |
| 7,360,691 B2 | 4/2008 | Takayama | |
| 7,523,856 B2 | 4/2009 | Block et al. | |
| 7,588,183 B2 | 9/2009 | Shane et al. | |
| 7,791,559 B2 | 9/2010 | Piasecki | |
| 7,814,016 B2 | 10/2010 | Pranger | |
| 7,856,116 B2 | 12/2010 | Rodriguez et al. | |
| 7,940,159 B2 | 5/2011 | Clemens et al. | |
| 7,992,789 B2 | 8/2011 | Borracci | |
| 8,237,068 B2 | 8/2012 | Szaikowski | |
| 8,276,823 B2 | 10/2012 | Chen | |
| 8,317,094 B2 | 11/2012 | Lehman | |
| 8,378,932 B2 * | 2/2013 | Fein | G06F 1/1652 345/30 |
| 8,392,965 B2 | 3/2013 | Carter et al. | |
| 8,399,889 B2 | 3/2013 | Wu et al. | |
| 8,413,893 B2 | 4/2013 | Kim | |
| 8,471,782 B2 | 6/2013 | Muklashy et al. | |
| 8,479,981 B2 | 7/2013 | Carmichael et al. | |
| 8,523,059 B1 | 9/2013 | Mullen et al. | |
| 8,540,151 B1 | 9/2013 | Snyder et al. | |
| 8,678,293 B2 | 3/2014 | Chen | |
| 8,756,680 B2 | 6/2014 | Shashidhar | |
| 8,810,816 B2 * | 8/2014 | Fischer | G06K 19/077 235/380 |
| 8,820,638 B1 | 9/2014 | Cotter et al. | |
| 2003/0145205 A1 | 7/2003 | Sarcanin | |
| 2003/0208405 A1 | 11/2003 | Putman et al. | |
| 2005/0102499 A1 * | 5/2005 | Kosuga | G06F 21/64 713/152 |
| 2005/0134461 A1 | 6/2005 | Gelbman et al. | |
| 2005/0173518 A1 | 8/2005 | Takayama | |
| 2006/0016884 A1 | 1/2006 | Block et al. | |
| 2006/0091223 A1 | 5/2006 | Zellner et al. | |
| 2006/0131393 A1 * | 6/2006 | Cok | G06K 19/0716 235/380 |
| 2006/0261174 A1 | 11/2006 | Zellner et al. | |
| 2007/0273507 A1 | 11/2007 | Burchell et al. | |
| 2007/0279315 A1 | 12/2007 | Laves et al. | |
| 2008/0035736 A1 | 2/2008 | Tompkin et al. | |
| 2008/0158150 A1 | 7/2008 | Rossman et al. | |
| 2009/0039154 A1 | 2/2009 | Williams et al. | |
| 2010/0084476 A1 | 4/2010 | Zellner et al. | |
| 2010/0260388 A1 | 10/2010 | Garrett et al. | |
| 2010/0302206 A1 | 12/2010 | Yu et al. | |
| 2011/0060640 A1 | 3/2011 | Thompson et al. | |
| 2011/0140841 A1 | 6/2011 | Bona et al. | |
| 2011/0178928 A1 | 7/2011 | Carmichael et al. | |
| 2011/0241996 A1 | 10/2011 | Vesely | |
| 2012/0280924 A1 | 11/2012 | Kummer et al. | |
| 2013/0162594 A1 | 6/2013 | Paulsen et al. | |
| 2013/0221112 A1 | 8/2013 | Lai et al. | |
| 2013/0232082 A1 | 9/2013 | Krawczewicz et al. | |
| 2014/0007002 A1 * | 1/2014 | Chang | G06F 3/04883 715/780 |
| 2014/0081729 A1 | 3/2014 | Ocher | |
| 2014/0093144 A1 | 4/2014 | Feekes | |
| 2014/0114861 A1 | 4/2014 | Mages et al. | |
| 2014/0172700 A1 | 6/2014 | Teuwen et al. | |
| 2014/0226275 A1 * | 8/2014 | Ko | G06F 1/1626 361/679.27 |
| 2014/0291406 A1 | 10/2014 | Ko | |
| 2014/0337957 A1 | 11/2014 | Feekes | |
| 2014/0353384 A1 | 12/2014 | Hoegerl et al. | |
| 2015/0077646 A1 | 3/2015 | Chen et al. | |
| 2015/0262052 A1 | 9/2015 | Pahuja | |
| 2016/0004945 A1 | 1/2016 | Wade | |
| 2016/0054479 A1 | 2/2016 | Ho et al. | |
| 2016/0085325 A1 | 3/2016 | Lee et al. | |
| 2016/0171461 A1 | 6/2016 | Hoover et al. | |
| 2016/0210453 A1 * | 7/2016 | Seo | G06F 21/32 |
| 2016/0224528 A1 * | 8/2016 | Trevarthen | G06F 17/242 |

OTHER PUBLICATIONS http://www.us.schott.com/innovation/ultrathinglass/, Retrieved on Sep. 14, 2016.
"Schott's Reliable and Strong Ultra-Thin Glass Features in Fingerprint Sensors in new Smartphones," Retrieved on Sep. 14, 2016.
Ron Martens, "The OLED Handbook, A Guide to OLED Technology, Industry & Market," 2015 Edition.
Bryce Kellogg, Vamsi Talla, Shyamnath Gollakota and Joshua R. Smith, "Passive Wi-Fi: Bringing Low Power to Wi-Fi Transmissions," Retrieved on May 11, 2016.
Ron Mertens, SecureCard—A New Secure Credit Card Technology, Utilizing an OLED Display, Nov. 21, 2006, Metalgrass Software.
John Wehr, "Card Size Specifications: When Does Card Size Matter?" Jan. 1, 2002.
Zachary Shahan, "Ultra-Thin-Solar-Cell Company Unstealths, Aims to Cut Cost of Solar Cells in Half!" Mar. 14, 2012, Sustainable Enterprises Media, Inc.
"ISO Magnetic Stripe Card Standards," Retrieved on Jul. 18, 2016.
"Coin Vs. Plastic: Which Credit Card Consolidation Tool is the Best?" Retrieved on Apr. 7, 2016, PayProTec.
"Tiny Batteries Could Revolutionize Green Energy," Retrieved on Apr. 5, 2016, National Geographic Society.
"Yubikey 4 & Yubikey 4 Nano," Retrieved on Apr. 7, 2016, Yubico.
"Magnetic Stripe Card Standards," Retrieved on Apr. 20, 2016, MagTek Inc., Seal Beach, California.
"A Power-Harvesting Pad-Less mm-sized 24/60GHz Passive Radio With On-Chip Antennas," Retrieved on Apr. 19, 2016, IEEE.
"Magnetic Stripe Card Recommendations," Retrieved on Apr. 20, 2016.
"Plastic Card Manufacturing Including Magnetic Stripe Tapelaying," Retrieved on Apr. 20, 2016.
Paul Buckley, "Flexible OLED Displays Target Volume Production in 2015," Feb. 5, 2015.
"MAX2837—2.3GHz to 2.7GHz Wireless Broadband RF Transceiver," Retrieved on May 30, 2016, Maxim Integrated.
"Ultrathin Rechargeable Lithium Polymer Batteries from PowerStream," Apr. 5, 2016, Lund Instrument Engineering, Inc.
Tom Abate, "Stanford Engineers Aim to Connect the World with Ant-Sized Radios," Sep. 9, 2014, Stanford University, Stanford California.
http://www.schott.com/advanced_optics/english/syn/advanced_optics/products/wafers-and-thin-glass/glass-wafer-and-substrates/ultra-thin-glass/index.html, Retrieved on May 30, 2016.
Jennifer Langston, "UW Engineers Achieve Wi-Fi at 10,000 Times Lower Power," Feb. 23, 2016.
Ron Mertens, "New All-In-One Credit Card Concept," Oct. 29, 2009, Metalgrass Software.
"Wi-Fi," Apr. 12, 2016, Wikimedia Foundation, Inc.
"Ant-Sized IoT Radio," Retrieved on Jul. 18, 2016.
Nick Pino, "Samsung's Latest OLED Can be a Mirror, a Window, or a TV," Jun. 11, 2015, Future US, Inc., San Francisco, California.
"Pneumatic Tube," Mar. 11, 2016, Wikimedia Foundation, Inc.
"New Virtual Tellers," Retrieved on Jun. 6, 2016, Frontier Bank.
Dario Borghino, "High-Tech Light Shutter Could Help Turn Your Windows into LCD Displays," May 1, 2015, Gizmag.
L. Zhao et al. "Novel Method for Fabricating Flexible Active Matrix Organic Light Emitting Diode (AMOLED) Displays," Sep. 21, 2011, Hewlett-Packard Development Company, L.P.
Amar Toor, "LG Unveils Flexible Plastic E-paper Display, Aims for European Launch Next Month," Mar. 29, 2012.

(56) References Cited

OTHER PUBLICATIONS

Martyn Williams, "Samsung, LG Show Flexible OLED, E-Paper Screens," Nov. 10, 2010.
"Electronic Paper," Jun. 10, 2016, Wikimedia Foundation, Inc.
"E Ink," Jun. 8, 2016, Wikimedia Foundation, Inc.
"Ink Technology: Electrophoretic Ink, Explained," Retrieved on Jun. 20, 2016, E Ink Holdings, Inc.
"Are Toeprints Unique, Like Fingerprints?" Retrieved on Jun. 23, 2016.
Sampath Srinivas, Dirk Balfanz, Eric Tiffany, Alexi Czeskis, "Univeral $2^{nd}$ Factor (U2F) Overview", May 14, 2016, FIDO Alliance.
"Sonavation Announces Fingerprint Imaging Through Smart Phone OLED Display," Feb. 22, 2016.
Dario Borghino, "Wearable Thermoelectric Generator Could Extend Your Smartwatch's Battery Life", Apr. 14, 2014, Gizmag.
"Inductive Charging", May 6, 2016, Wikimedia Foundation, Inc.
"Near Field Communication", Apr. 29, 2016, Wikimedia Foundation, Inc.
Sumi Das, "A Keyboard that Rises Up From Flat Touch Screens," Feb. 13, 2013.
Jessica Leber, "A Shape-Shifting Smartphone Touch Screen," Dec. 3, 2012.
Matthew Frankel, "Could This Be the Bank of the Future'?" Nov. 9, 2014.
"Contactless Payment," Jul. 27, 2016, Wikimedia Foundation, Inc.
Zhiquin Chen, "Java Card Technology for Smart Cards: Architecture and Programmer's Guide," pp. 11-14, Copyright 2000, Sun Microsystems, Inc., Palo Alto, California.

\* cited by examiner

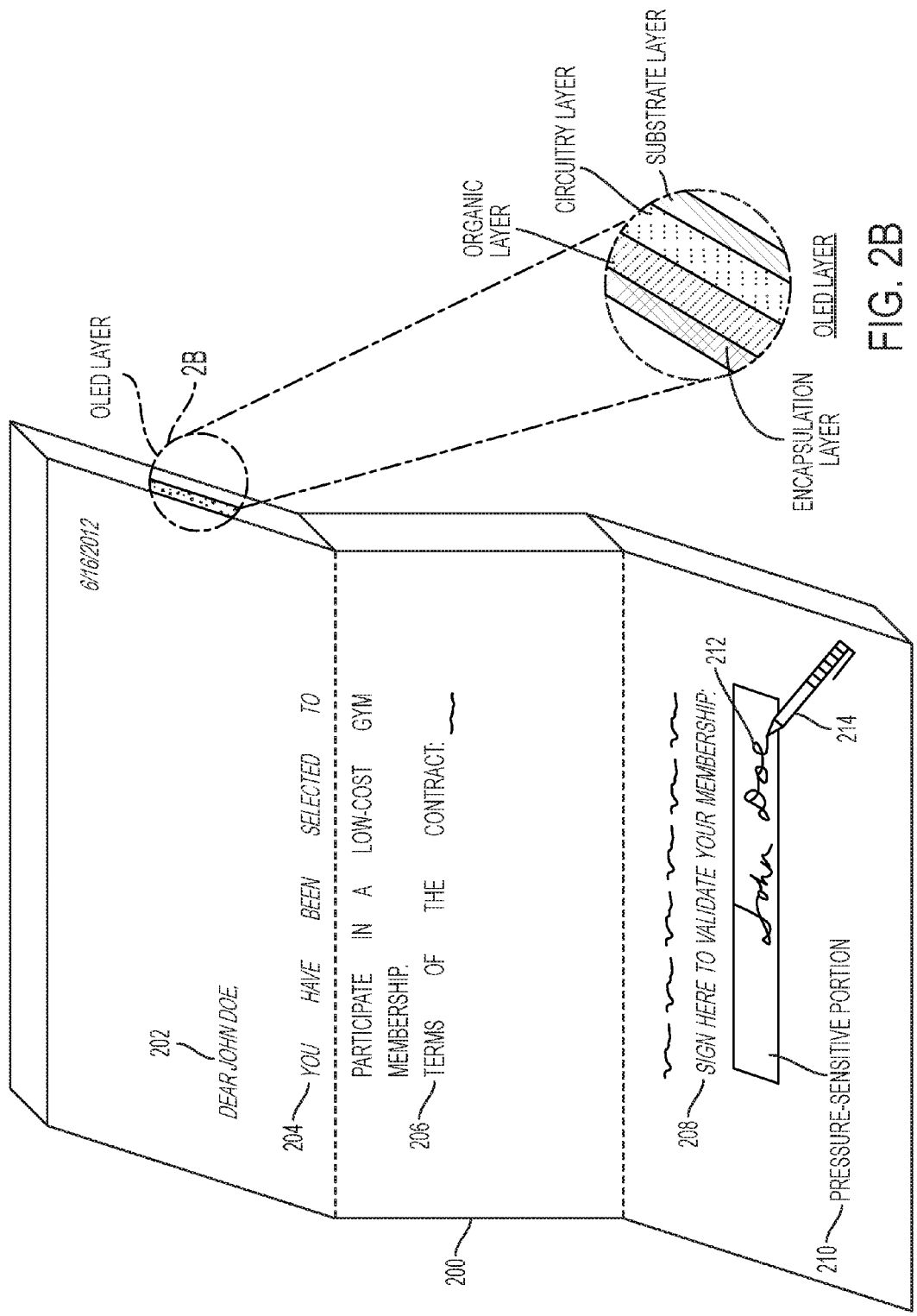

ORGANIC LIGHT EMITTING DIODE ("OLED")-BASED DISPLAYS

FIELD OF THE DISCLOSURE

This invention relates to displays. Specifically, this invention relates to OLED-based displays.

BACKGROUND OF THE DISCLOSURE

Conventionally, entities transmitted documentation to a range of customers and/or other entities for various purposes. The documentation typically was transmitted via postal mail, email, fax, courier or any other suitable method. Some examples of transmitted documentation may include contracts, offers for sale, offers of credit, bills, requests for information, receipts, notices and account statements.

Often, by the time the customer and/or other entities received the documentation, the documentation had become moot or obsolete. Sometimes, transmitted documentation required a customer's signature and retransmission of the signed documentation back to the entity. Other times, a customer was required to enter timely information into the documentation and retransmit the documentation to the entity. Retransmission of the documentation from the customer to the entity may have been via scan and fax, scan and email, photo capture and email, postal mail or any other suitable method. Often, the retransmission did not occur within a relevant window of time.

Therefore, it would be desirable to have apparatus and methods that enable live OLED-based documentation and displays. It would be further desirable to enable transmission of information directly from such apparatus and methods to a sender independent of other transmission methods and/or apparatus.

SUMMARY OF THE DISCLOSURE

An OLED-based foldable display is provided. The OLED-based foldable display may include an array of organic light emitting diodes ("OLEDs"). The array of OLEDs may form the display. A portion of the array of OLEDs may have a surface area that is a percentage of an area of 8.5 by 11 square inches. The percentage may be 1%, 5%, 10%, 25%, 50%, 75%, 100% or any other suitable percentage of the area of 8.5 by 11 square inches. The array of OLEDs may further include a pressure-sensitive portion. The pressure-sensitive portion may be configured to capture a handwritten signature.

The display may include a wireless communication circuit. The display may include a processor circuit. The processor circuit may include a non-transitory memory and a processor. The display may also include a battery. The battery may power the OLED display, the pressure-sensitive portion, the wireless communication circuit and/or the processor circuit.

In operation, the processor circuit may be configured to control the OLED display, the pressure-sensitive portion and/or the wireless communication circuit by executing tasks or transmitting instructions to execute tasks. One task may include receiving a handwritten signature on the pressure-sensitive portion. Another task may include storing the handwritten signature in the non-transitory memory as a pixelated image. Another task may include storing a date time value of the receipt time of the signature in the non-transitory memory. Another task may include scanning, via the communication circuit, for a wireless communication network. Another task may include transmitting the pixelated image, the date time value and an identification number associated with the display to a secure entity hub. The transmitting may be upon detecting a wireless communication network. The transmitting may be over the wireless communication network.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which:

FIG. 2A shows an illustrative OLED-based foldable display;

FIG. 2B shows an exploded, cut-away, side view of the illustrative OLED-based foldable display;

DETAILED DESCRIPTION OF THE DISCLOSURE

Figure 1A:
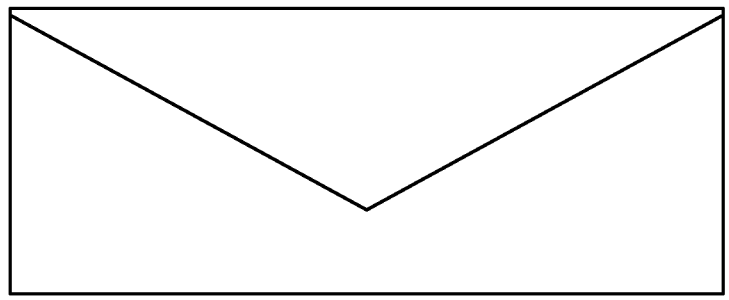
FIG. 1A shows the back of an illustrative standard envelope.

An OLED-based foldable display may be provided. OLEDs are typically solid-state semiconductors constructed from a thin film of organic material. OLEDs emit light when electricity is applied across the thin film of organic material. Because OLEDs are constructed using organic materials, OLEDs may be safely disposed without excessive harm to the environment.

Furthermore, OLEDs may be used to construct a display that consumes less power compared to other display technologies. For example in a Liquid Crystal Display (hereinafter, "LCD") power must be supplied to the entire backlight even to illuminate just one pixel in the display. In contrast, an OLED display does not include a backlight. Furthermore, in an OLED display only the illuminated pixel(s) draw power, which is preferable for mobile and battery-powered applications such as the current invention.

Therefore, power efficiency of OLED technology presents a possibility for designing OLED-based foldable displays.

The display may include an array of organic light emitting diodes ("OLEDs"). The array of OLEDs may form the display. The surface area of at least a portion of the OLED-based display may be at least 25% of an area defined by a width of 8.5 inches and a length of 11 inches. The surface area may be any other suitable percentage of any other suitable size display. For example, the surface area may be 5% of an area defined by a width of 20 inches and a length of 30 inches.

The array of OLEDs may include a pressure-sensitive portion. The pressure-sensitive portion may be configured to capture a handwritten signature. The pressure-sensitive portion may also be configured to capture one or more of a person's biometric characteristics. The one or more biometric characteristics may be a fingerprint, a toeprint and/or any other suitable biometric characteristic.

In some embodiments, a second pressure-sensitive portion may be configured to capture a person's biometric characteristic. In other embodiments, a biometric characteristic capture film may capture a person's biometric characteristic without the person's knowledge. In some embodiments, a camera, embedded in the display, may be configured to capture a person's biometric characteristic. The received biometric characteristic may be transferred into an array of bytes on the non-transitory memory. The array of bytes on the non-transitory memory may be transmitted to the secure entity hub together with a pixelated image.

The array of OLEDs may display information. Using OLEDs to display information may have several technical advantages. OLED displays may provide lower power consumption, wider viewing angles, better colors, higher contrast, operate in wider temperature ranges and enable faster refresh rates than other display technology. In some embodiments, OLED displays may be fabricated directly on control circuitry. OLED displays may only include trace amount of heavy metals. Thus, when disposed of, OLED displays may be less harmful to the environment than other display technology.

The display may include a communication circuit. The communication circuit may be configured to implement protocols for wireless communication. For example, the wireless communication circuit may provide Wi-Fi, NFC (near field communication), Bluetooth or any other suitable means of wireless communication. Wi-Fi may include passive Wi-Fi with lower power consumption than typical Wi-Fi. The communication circuit may have a thickness that is not greater than 0.8 mm.

The display may include a processor circuit. The processor circuit may be alternatively referred to herein as a software chip. The processor circuit may have a thickness that is not greater than 0.25 mm. The processor circuit may include a processor for controlling overall operation of the display and its associated components. The display may include RAM, ROM, one or more input/output ("I/O") modules and one or more non-transitory or non-volatile memory components.

The I/O module may include a microphone, camera, pressure-sensitive portion, button and/or touch screen which may accept user provided input. The I/O module may include one or more of a speaker for providing audio output and a video display for providing textual, audiovisual, and/or graphical output. The video display may include one or more of the OLEDs.

Software may be stored within the non-transitory memory and/or other storage medium. The software may provide instructions to the processor for enabling the display to perform various functions. For example, the non-transitory memory may store software used by the display, such as an operating system, application programs and an associated database. Additionally, the information in the non-transitory memory may be encrypted to protect private information of the entity and its customer. Alternatively, some or all of the computer executable instructions of the display may be embodied in hardware or firmware components of the display.

Application programs, which may be used by the display, may include computer executable instructions for invoking user functionality related to communication, such as email, short message service (SMS), and voice input and speech recognition applications. Application programs may utilize one or more algorithms that request alerts, process received executable instructions, perform power management routines or other suitable tasks.

The OLED-based display may include a battery. The battery may be for powering the OLED display, the pressure-sensitive portion, the communication circuit and the processor circuit. The battery may have a thickness not greater than 0.5 mm.

In operation, the processor circuit may be configured to control the OLED display, the pressure-sensitive portion, the wireless communication circuit and the processor circuit by executing tasks or transmitting instructions to execute tasks. The tasks may include receiving a handwritten signature on the pressure-sensitive portion. The tasks may include storing the handwritten signature in the non-transitory memory as a pixelated image. The tasks may include storing, in the non-transitory memory, a date time value of the receipt time of the handwritten signature. The tasks may include, scanning, via the communication circuit, for a wireless communication network. The tasks may include transmitting, over the wireless communication network, the pixelated image, the date time value and an identification number associated with the display to a secure entity hub. The transmitting may be initiated upon detecting a wireless communications network.

In an exemplary embodiment, the display may include a contract. The contract may be mailed to a customer. The display may foldable. When trifolded the display may be sized to fit into a #10 standard envelope. The mailing may be in a #10 standard envelope. The mailing may be in any other suitable envelope or mailer. Upon opening the envelope or mailer, a potential customer may view the contract displayed on the OLED-based foldable display.

The OLED-based display may be solar-powered or light-powered. Upon opening the display, e.g., exposing the display to the sun or another source of light, the display may be "turned on." In the event that the customer would like to execute the contract, the customer may sign the contract on the pressure-sensitive portion of the display. A pixelated image of the handwritten signature may then be transmitted from the communications circuit, via a detected wireless communications network, to the secure entity hub. The secure entity hub may be the contract's issuer. The secure entity hub may be a mailing entity associated with the contract's issuer.

An identification number associated with the display may be transmitted along with the handwritten signature. The identification number may enable the secure entity hub to determine what signature was received and from whom it was received.

In some embodiments, the secure entity hub may retain a record for each display that was sent. Each record may include what is displayed on the display, the identification number associated with the display and the entity, customer or person to which the display was mailed.

The secure entity hub may verify receipt of the signature. The secure entity hub may transmit the verification, via the wireless communication network, to the communication circuit. The verification may include the identification number and a message that the signature has been verified (and/or accepted) and the contract is valid. Upon receipt of the verification, the display may display the verification to the customer.

In some embodiments, in an attempt to perform fraud prevention, the signature may be denied. A denial may be transmitted to the display. This may occur when, upon comparison of the pixelated image to the secure entity hub's stored image (of the customer's signature), there exists a difference greater that a predetermined degree of accuracy.

Upon verification of the contract, the secure entity hub may mail the signed contract to the customer. In other embodiments, the secure entity hub may email the signed contract to the customer. In yet other embodiments, the secure entity hub may fax the signed contract to the customer.

In some embodiments, the signature may become imprinted or embossed upon the substrate, which may be paper, plastic, laminated poster or any other suitable substrate.

In some embodiments, the OLED-based display may include a portion of electrophoretic ink. Electrophoretic ink may preferably include bistable properties. A bistable image may be retained on a display even when all power sources are removed. Therefore, once the pixels in an electrophoretic display are set, the pixels are maintained on the display in the set order regardless of the power level of the display. Because of its bistable properties, electrophoretic ink may enable an OLED-based display to display the handwritten signature even after the display loses power. In an exemplary embodiment, this feature may enable a customer to sign a contract, receive signature verification and put the contract in safekeeping as physical proof of the contract; all without ever using—i.e., being preferably completely independent of—another method of communication with the secure entity hub.

In these embodiments, the array of OLEDs may be positioned above a layer of electrophoretic ink in a stacked architecture. This may enable the electrophoretic ink to be maintained even when the powerable OLED is no longer available. In some embodiments, the electrophoretic ink may be located only under a portion of the array of OLEDs. In yet other embodiments, the electrophoretic ink may be side-by-side with the OLED display. In still other embodiments, only the signature portion (pressure-sensitive portion) of the display may be formed from electrophoretic ink.

In some embodiments, the communication circuit may be configured to detect a second software chip. The software chip may be detected via NFC, Bluetooth, Wi-Fi or any other suitable communication method. The second software chip may be an EMV chip embedded in a credit card, debit card, bank card or any other suitable card. The second software chip may be a chip embedded in an identification card, such as, a driver's license, driver's permit, non-driver identification card, passport, employee identification card, student identification card or any other suitable card. The second software chip may be embedded in a cell phone, smartphone, tablet, laptop, or any other suitable device.

The OLED-based display may attempt to retrieve identification information from the second software chip. The identification information may include a name, address, telephone number, income bracket, social security number, tax identification number or any other suitable identification information. The wireless communication circuit may transmit the identification information to the secure entity hub. In some embodiments, the wireless communication circuit may transmit the identification information to the secure entity hub, via the user's wireless device. The device may be a smartphone. The secure entity hub may then transmit a packet to the OLED-based display comprising personalized display information. In some embodiments, the secure entity hub may transmit the packet, via cellular communications on the user's device, to the OLED-based display. The personalized display include may include, for example, a contract or offer personalized and/or customized for the potential customer or client.

In some embodiments, the OLED-based display may include a card blank. The card blank may be temporarily fastened to the display. The fastening may enable communications between the card and the display. The card blank may also be embedded in the display. The card blank, embedded in the display, may be electrically coupled to the display at one or more locations of the card blank's perimeter. The card blank's perimeter may perforated to enable a user to remove the card blank upon completion of a registration process. The perforated connections may form electrical connections to enable communications—i.e., electronic signals—between the OLED display and the card blank.

Upon transmission of A) identifying information received via communication with the second software chip; and B) a handwritten signature acknowledging the customer's agreement to the terms and conditions of the contract, the secure entity hub may transmit A) card blank information—i.e., information for transforming the card blank into an active credit card; B) acceptance of the handwritten signature; and C) the OLED-based identification number, to the OLED-based display. Upon receipt of these three segments of information, the OLED-based display may A) change the display of the card to include the card blank information; B) transmit the card blank information into a software chip located on the card blank; and C) write the card blank information to a magnetic strip located on the card blank; thereby, activating the card blank. The card blank may become activated to perform as a smart card.

A smart card may include an array of OLEDs. The array of OLEDs may have a thickness not greater than 0.25 mm. The array of OLEDs may have a surface area that is at least 90% of 85.60 mm×53.98 mm. The smart card may include a pressure-sensitive button. The pressure-sensitive button may have a thickness not greater than 0.8 mm. The smart card may include a wireless communication circuit. The wireless communication circuit may have a thickness not greater than 0.8 mm. The smart card may include a processor circuit. The processor circuit may include a non-transitory memory and a processor. The processor circuit may have a thickness that is not greater than 0.25 mm. The smart card may include a battery. The battery may be for powering the OLED display, the wireless communication circuit and the processor circuit. The battery may have a thickness that is not greater than 0.5 mm.

The OLED-based display may transmit a second packet to the secure entity hub. The packet may include the display identification number and a message that the card blank has been activated.

The customer may remove the card blank from the display in order to utilize the card blank. In some embodiments, the first time the customer utilizes the card blank, the card comprising the second software chip may be required as identification in order to utilize the card blank.

Illustrative embodiments of apparatus and methods in accordance with the principles of the invention will now be described with reference to the accompanying drawings, which form a part hereof. It is to be understood that other embodiments may be utilized and structural, functional and procedural modifications may be made without departing from the scope and spirit of the present invention.

The drawings show illustrative features of apparatus and methods in accordance with the principles of the invention. The features are illustrated in the context of selected embodiments. It will be understood that features shown in connection with one of the embodiments may be practiced in accordance with the principles of the invention along with features shown in connection with another of the embodiments.

Apparatus and methods described herein are illustrative. Apparatus and methods of the invention may involve some or all of the features of the illustrative apparatus and/or some or all of the steps of the illustrative methods. The steps of the methods may be performed in an order other than the order shown or described herein. Some embodiments may omit steps shown or described in connection with the illustrative methods. Some embodiments may include steps that are not shown or described in connection with the illustrative methods, but rather shown or described in a different portion of the specification.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Figure 1B:
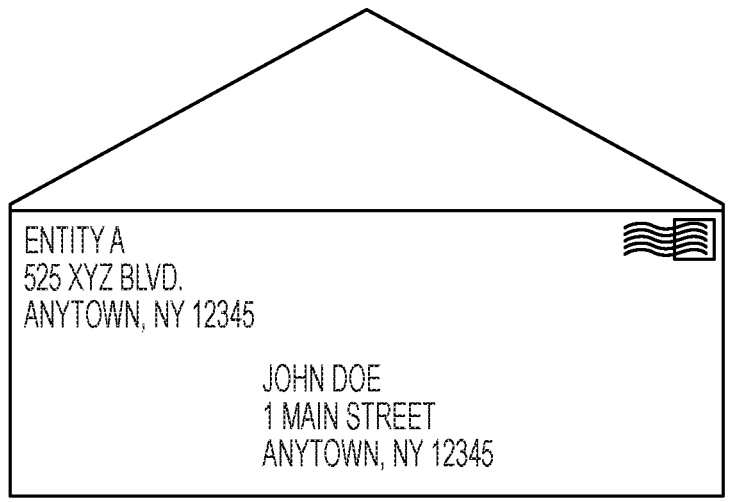
FIG. 1B shows the front of the illustrative standard envelope.

FIGS. 1A and 1B show an illustrative envelope. The envelope may be a #10 standard envelope. The envelope may be any other suitable size envelope. Inside the envelope may be an OLED-based display. The OLED-based display may be foldable in order to fit into a standard envelope.

Is some embodiments, if the substrate of the OLED-based display is not easily foldable, the OLED-based display may be hinged in a trifold manner in order to fold neatly into an envelope. The hinges may preferable enable the display to continue through the hinges. The hinges may be tape, plastic hinges, metal hinges or any other suitable hinges.

FIG. 2A shows illustrative OLED-based display 200. The OLED-based display may have been addressed to potential customer John Doe, as shown at text 202. Display 200 may attempt to encourage potential customer John Doe to sign up to participate in a gym membership, as shown at text 204. The terms of the contract may be printed on display 200, as shown at 206.

In the event that potential customer John Doe decides to purchase the gym membership and validate the contract, potential customer John Doe may sign on pressure-sensitive portion 210, as directed by text 208. John Doe's signature 212 may be signed using pen 214, or any other suitable instrument. The handwritten signature may be stored as a pixelated image in a non-transitory memory resident on display 200. A wireless communication circuit may transmit the pixelated image as well as an identification number associated with display 200 to a secure entity hub. The secure entity hub may be the entity that transmitted display 200 to John Doe.

Upon receipt of the pixelated image and the identification number at the secure entity hub, the secure entity hub may validate the gym membership. Signed display 200 may serve as proof of John Doe's gym membership.

FIG. 2B shows an exploded, cut-away, side view of illustrative display 200. Display 200 may include at least four layers. The four exemplary layers shown are A) encapsulation layer, B) organic layer, C) circuitry layer and D) substrate layer.

The encapsulation layer may protect the OLED layer from exposure to oxygen, water and other contaminants. Preferably, the encapsulation layer is flexible and transparent. Glass is a typical material for constructing an encapsulation layer. When glass is used to construct the encapsulation layer, the glass may be very thin and flexible. For example, the glass may be between 50 micrometers ($\mu$m) and 100 $\mu$m thick.

In some embodiments, the encapsulation layer may be constructed using thin-film encapsulation techniques such as Atomic Layer Deposition ("ALD"). ALD is a process that utilizes chemicals that, when deposited on a material, react to create a solid, thin film.

The organic layer may include an emissive solid-state semiconductor. The organic layer may be constructed from a thin film of organic (carbon-based) material. For example, the organic layer may include one or more OLEDs. When electricity is applied to an OLED within the organic layer, electrons flow through the organic layer and release photons, thereby emitting light. Different types of emissive materials may be used. Each type of material may be associated with a different color light. An intensity of light emitted by the organic layer may be controlled by the amount of electricity flowing through organic layer.

The organic layer may be doped with "host" materials. Host material may affect properties, such as power efficiency, of the organic layer. For example, the organic layer may be doped with emitter materials that improve its operation and/or achieve a desired color.

The organic layer may include two or more sub-layers (not shown). For example, the organic layer may include 5, 10 or 15 sublayers. Illustrative sub-layers may include: (1) an electron transport layer, (2) a blocking layer, (3) an emissive layer, (4) a hole transport layer and (5) an injection layer. The sub-layers may enhance an efficiency of the emissive layer.

For example, an emissive layer may be placed between a cathode and an anode. When electricity is applied, electrons flow from the cathode to the anode. OLED displays may be driven by either electrical current or voltage. In a preferred embodiment, the OLED display is driven by current. The cathode inserts electrons into the emissive layer, and the anode removes the electrons. The electron "flow" through the emissive layer releases photons, generating light. The color of the generated light may be changed by including different types of materials within the emissive layer.

A direction of light emitted by the organic layer may be controlled by a degree of transparency of the anode and/or cathode. In some embodiments, a cathode may be reflective. Such a cathode may be constructed using an aluminum based-compound or lithium fluoride. An anode may be transparent. A transparent anode may preferably be constructed using indium tin oxide. In such embodiments, when current flows between the cathode and anode, light is emitted through the circuitry layer and the substrate. The circuitry layer and substrate may be transparent. Such embodiments may be referred to as "bottom-emitting OLEDs."

In some embodiments, the cathode may be transparent. Such a cathode may preferably be constructed using indium tin oxide. The anode may be reflective. The reflective anode may direct light toward the transparent cathode. Such embodiments may be referred to as "top-emitting OLEDs." Typically, top-emitting designs are more efficient and are used to construct higher resolution displays.

Additionally, top-emitting designs may allow the organic layer to be formed on a non-transparent substrate. Small-and medium-sized OLED displays (e.g., 1-7 inches) are typically constructed using top-emitting techniques.

Organic layer may form one or more pixels. Different architectures are available for forming pixels using OLEDs. One architecture includes positioning different color (e.g., red, green and blue) OLEDs adjacent to each other. Another architecture may include stacking different color OLEDs on top of each other. OLEDs may be stacked because materials used to construct the organic layer may be transparent. A stacked design may provide a smaller pixel size and higher resolution.

Circuitry layer may include electronics that drive one or more pixels formed within the organic layer. Preferably, amorphous silicon ("a-Si") and low temperature polysilicon ("LTPS") may be used to construct the circuitry layer. In some embodiments, the circuitry layer may be transparent.

The substrate layer may support the circuitry layer, the organic layer and the encapsulation layer. The substrate layer may be constructed using various materials. For example, the substrate layer may be constructed using glass, plastic or metal materials. In some embodiments, such as in bottom-emitting OLEDs, the substrate layer may function as the encapsulation layer.

Figure 3:
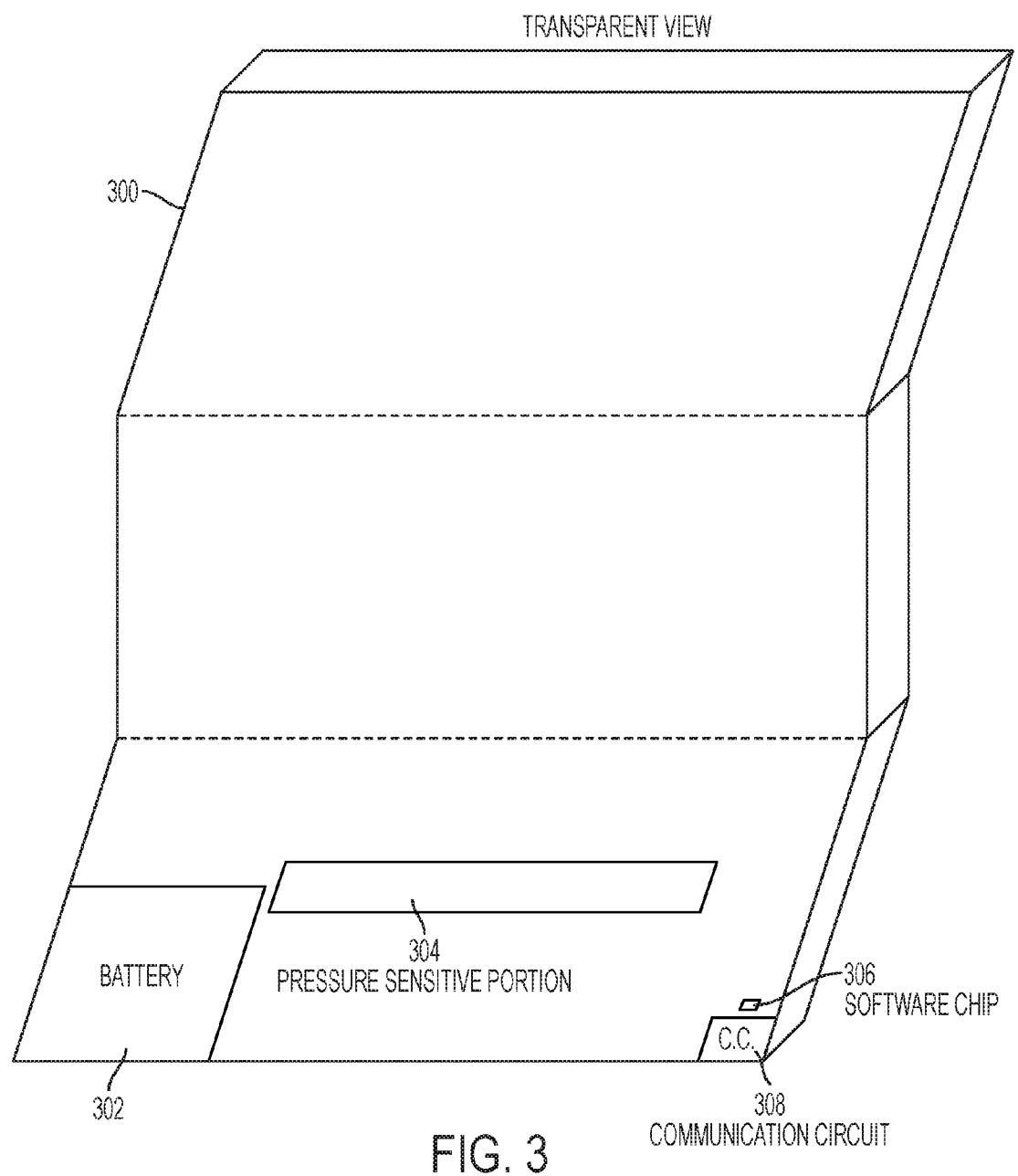
FIG. 3 shows a transparent view of an illustrative OLED-based foldable display.

FIG. 3 shows a transparent view of OLED-based display 300. Display 300 may include software chip 306. Software chip 306 may include a processor and a non-transitory memory. Software chip 306 may control substantially all the operations of display 300. In some embodiments, OLED display may include a plurality of software chips.

Display 300 may also include communication circuit 308. Communication circuit 308 may enable communication from the display with another communicative device. Communication circuit 308 may enable communication via Wi-Fi, Bluetooth, NFC, SMS, cellular signals and/or other suitable communication method.

Display 300 may also include pressure-sensitive portion 304. Pressure-sensitive portion 304 may be included in the OLED screen. Pressure-sensitive portion 304 may retain an imprint, e.g., a handwritten signature, a stamp, a fingerprint, a toeprint or any other suitable imprint. The retained imprint translated into an image may be stored in software chip 306.

Display 300 may also include battery 302. Battery 302 may power the components of display 300. Battery 302 may be solar-powered and/or light-powered.

Figure 4:
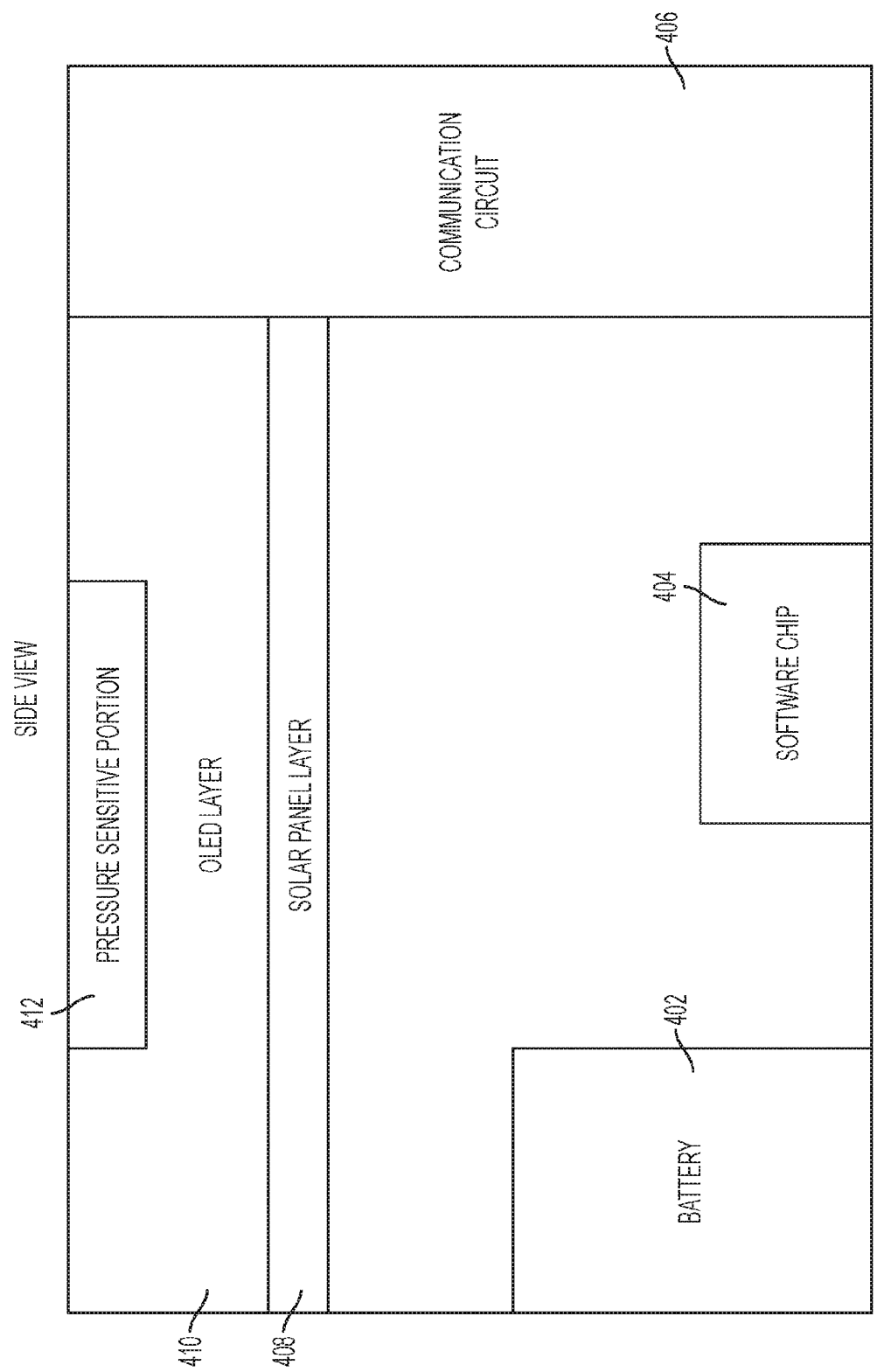
FIG. 4 shows a side view of an illustrative OLED-based foldable display.

FIG. 4 shows an illustrative side view of an OLED display. It should be appreciated that the dimensions shown are for the purposes of illustration and not for limitation. In some embodiments, the thickness of an OLED display may be 0.8 mm. In other embodiments, the thickness of the OLED display may be 0.05 mm, 0.01 mm, 0.015 mm, 0.03 mm, 0.05 mm or any other suitable width.

In some embodiments, the thickness of the OLED display may be variable, e.g., in some places, the OLED display may be 0.8 mm, while in other places, the OLED display may be 0.05 mm, 0.08 mm, 0.1 mm, 0.15 mm, 0.2 mm, 0.5 mm or any other suitable thickness.

The OLED-based display shown in FIG. 4 may include exemplary components: battery 402, software chip 404, communication circuit 406, solar panel layer 408, OLED layer 410 and pressure-sensitive portion 412.

FIGS. 5-9 show illustrative layers that may be present in an illustrative OLED-based display.

Figure 5:
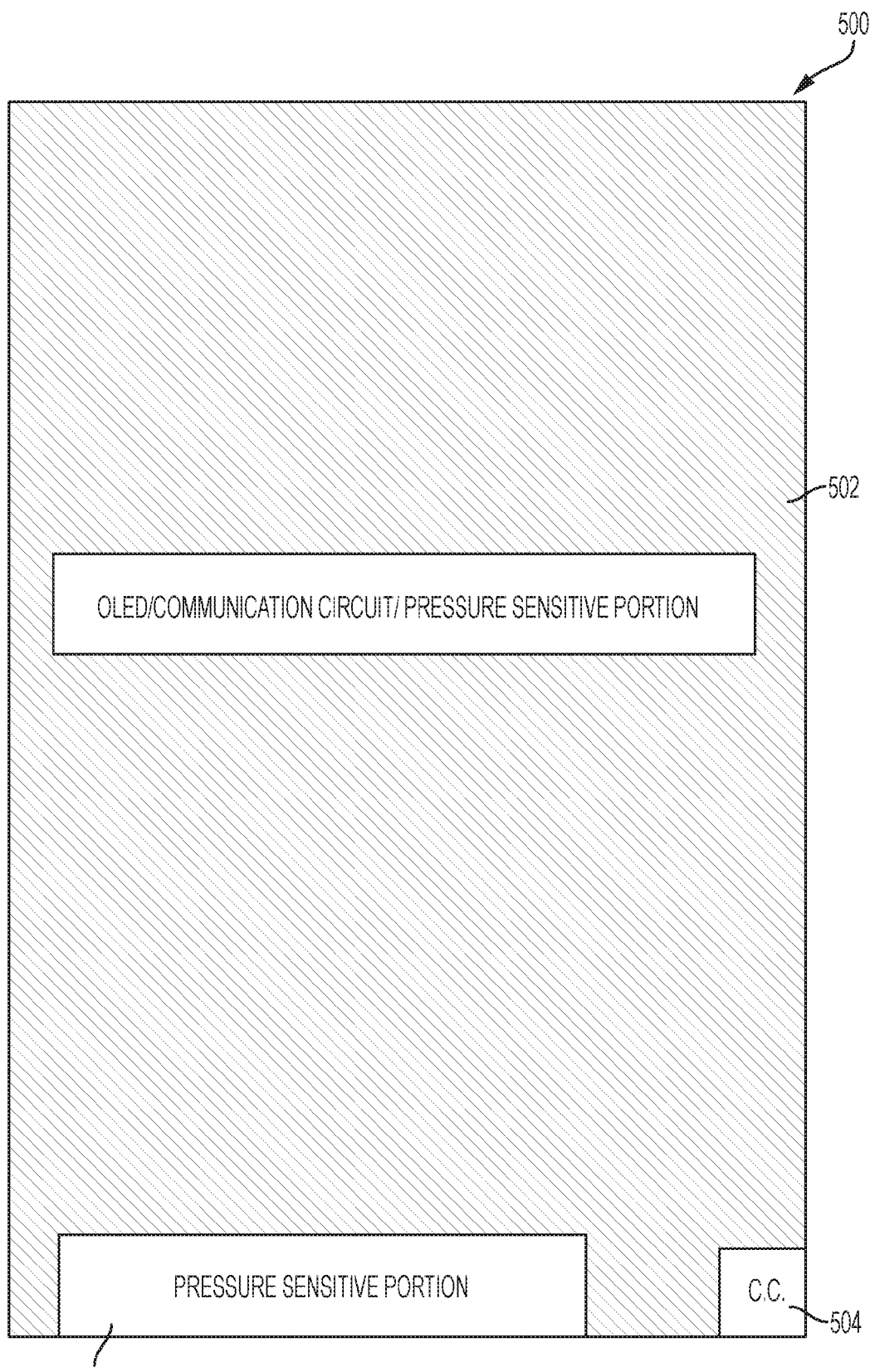
FIG. 5 shows an illustrative layer that may be present in an OLED-based foldable display.

FIG. 5 shows illustrative layer 500. Layer 500 may include array of OLEDs 502. FIG. 5 shows that, in some embodiments, communication circuit may penetrate layer 500. FIG. 5 also shows that, in some embodiments, pressure-sensitive portion may penetrate layer 500.

Figure 6:
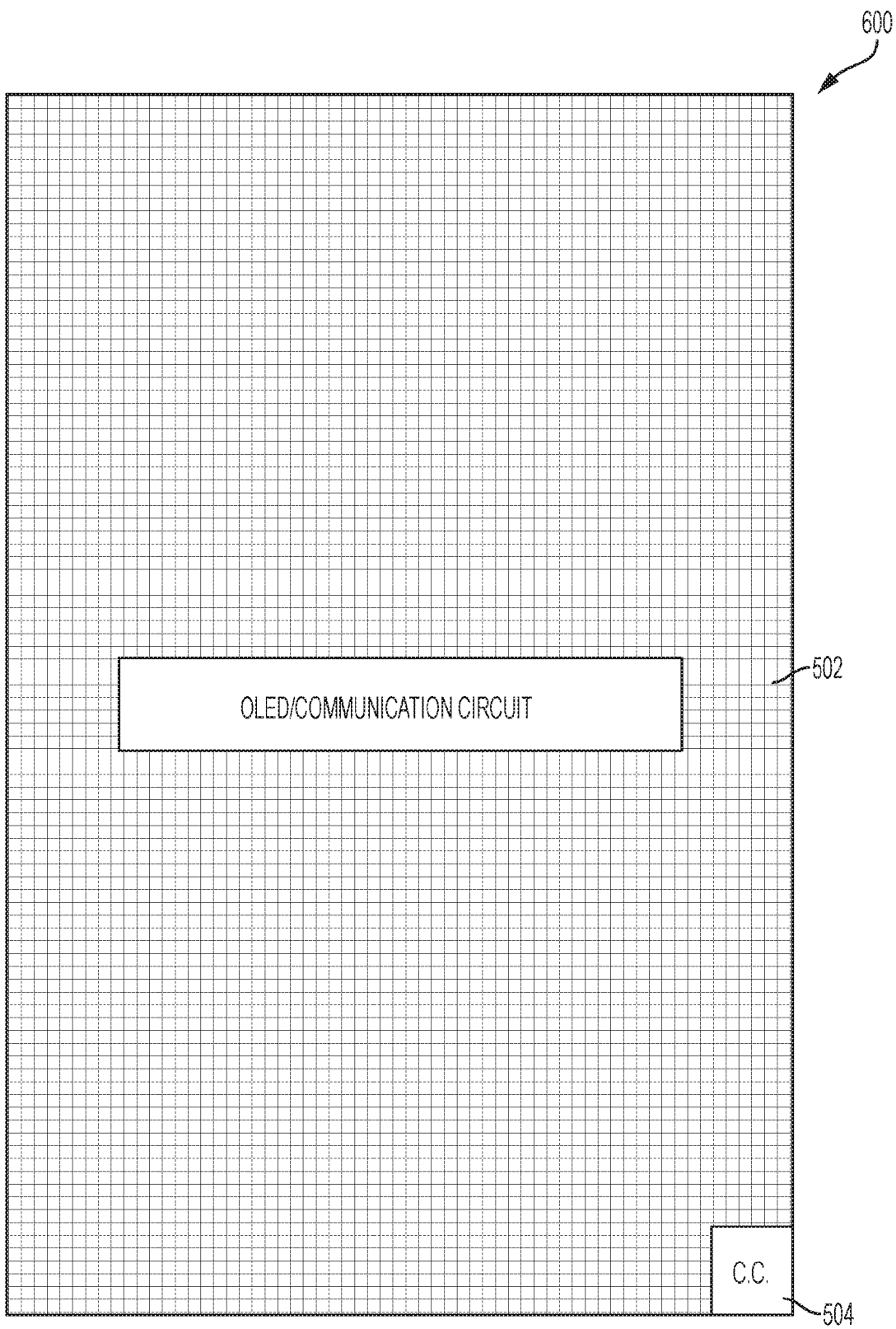
FIG. 6 shows another illustrative layer that may be present in an OLED-based foldable display.

FIG. 6 shows illustrative layer 600. Layer 600 also shows that, in certain embodiments, array of OLEDs 502 and communication circuit 504 may penetrate layer 600.

Figure 7:
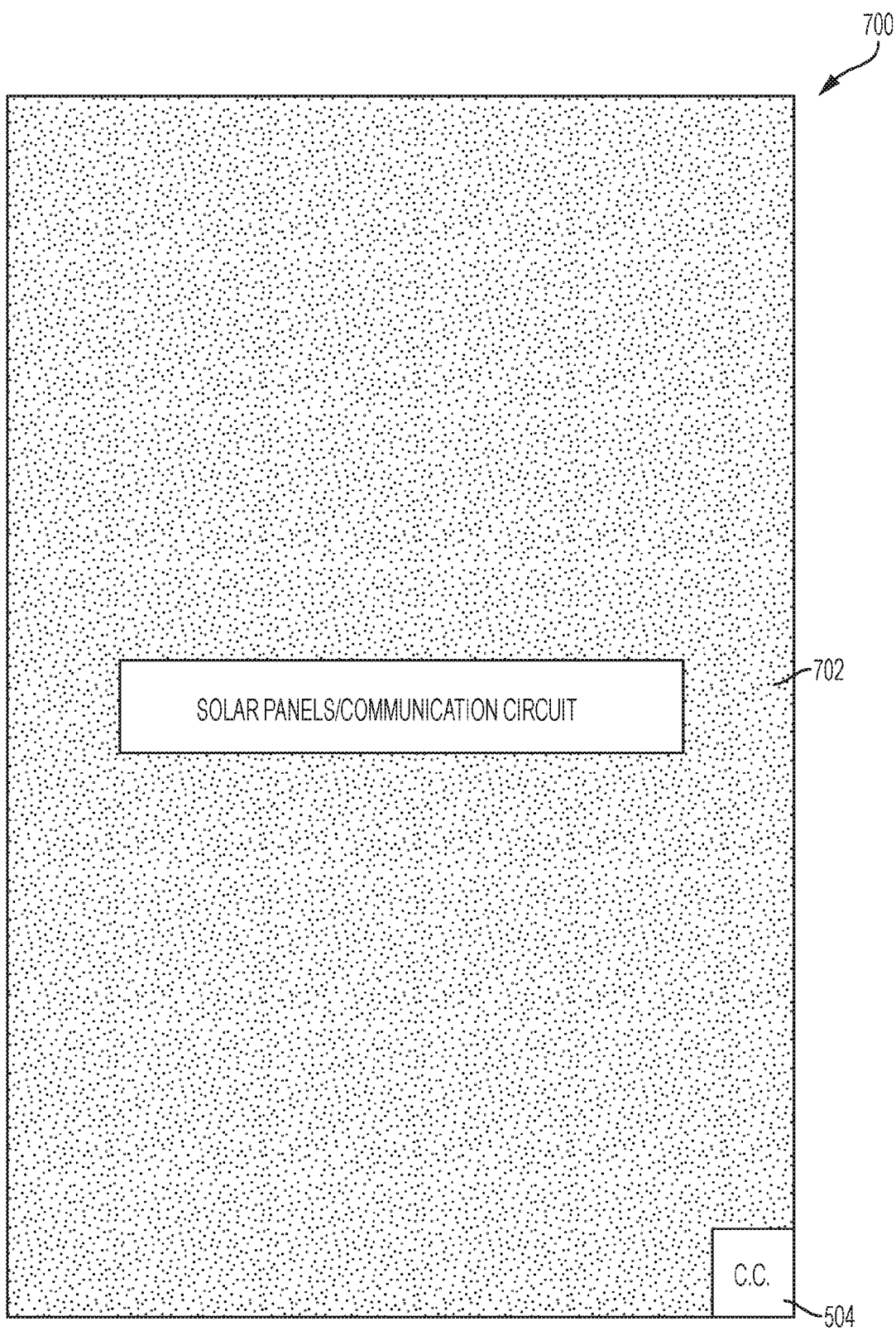
FIG. 7 shows yet another illustrative layer that may be present in an OLED-based foldable display.

FIG. 7 shows illustrative layer 700. Layer 700 shows solar panels 702 that may be used to power various components of the OLED-based display. FIG. 7 also shows that, in some embodiments, communication circuit 504 may penetrate layer 700.

Figure 8:
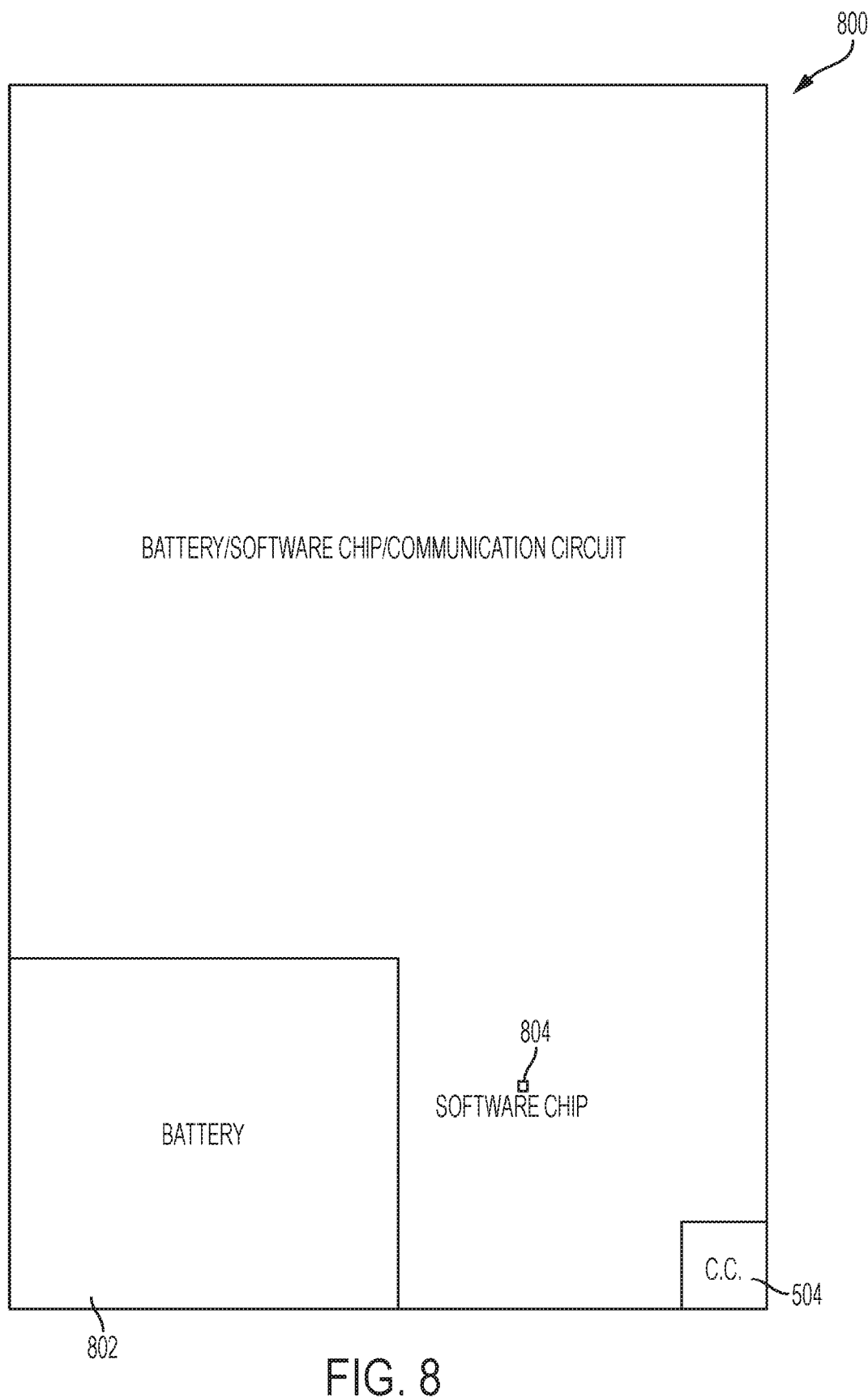
FIG. 8 shows still another illustrative layer that may be present in an OLED-based foldable display.

FIG. 8 shows illustrative layer 800. Layer 800 may include battery 802 and software chip 804. FIG. 8 shows that, in some embodiments, communication circuit 504 may penetrate layer 800.

Figure 9:
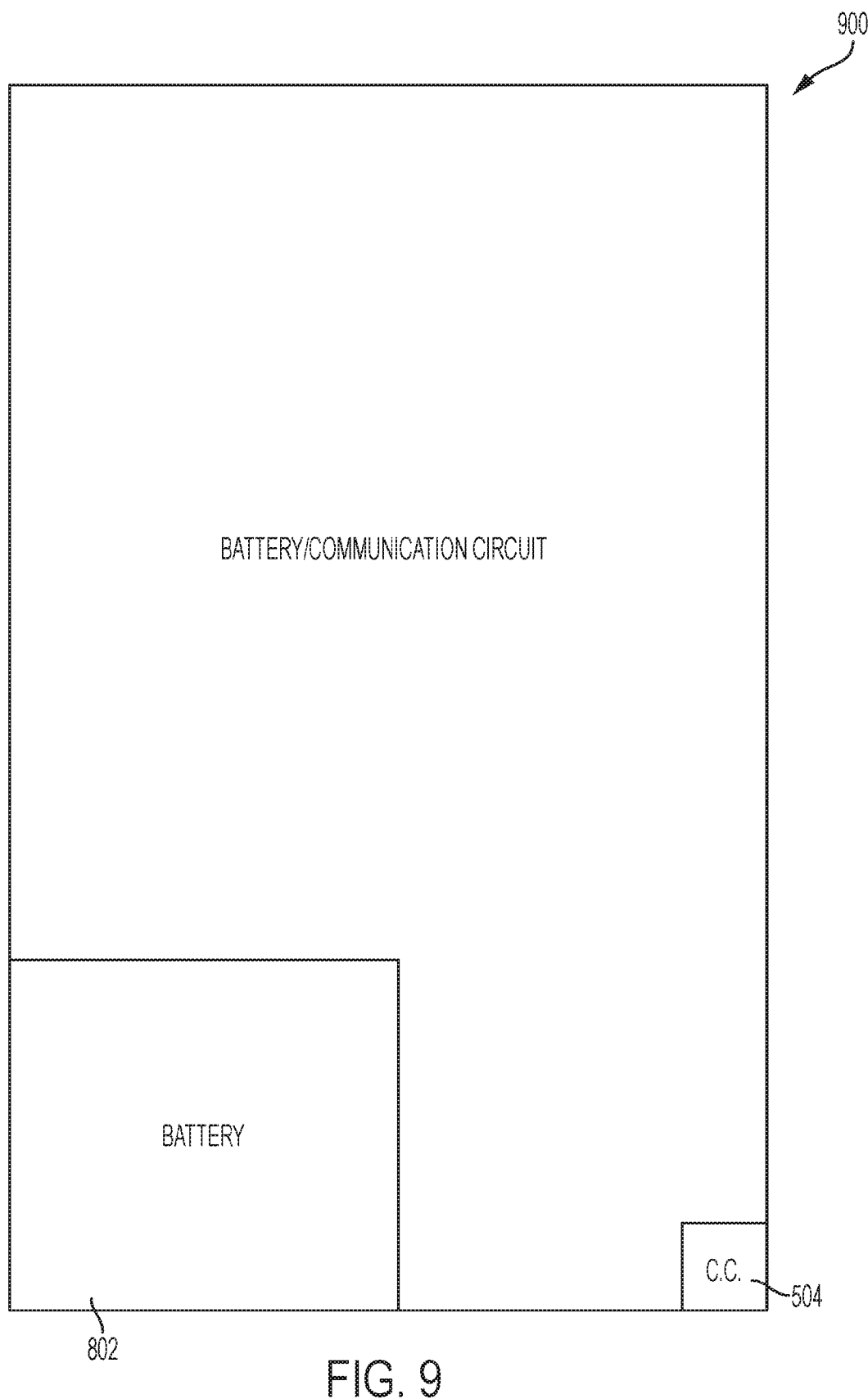
FIG. 9 shows yet another illustrative layer that may be present in an OLED-based foldable display.

FIG. 9 shows illustrative layer 900. FIG. 9 shows that, in certain embodiments, battery 802 and communication circuit 504 may penetrate layer 900.

Figure 10:
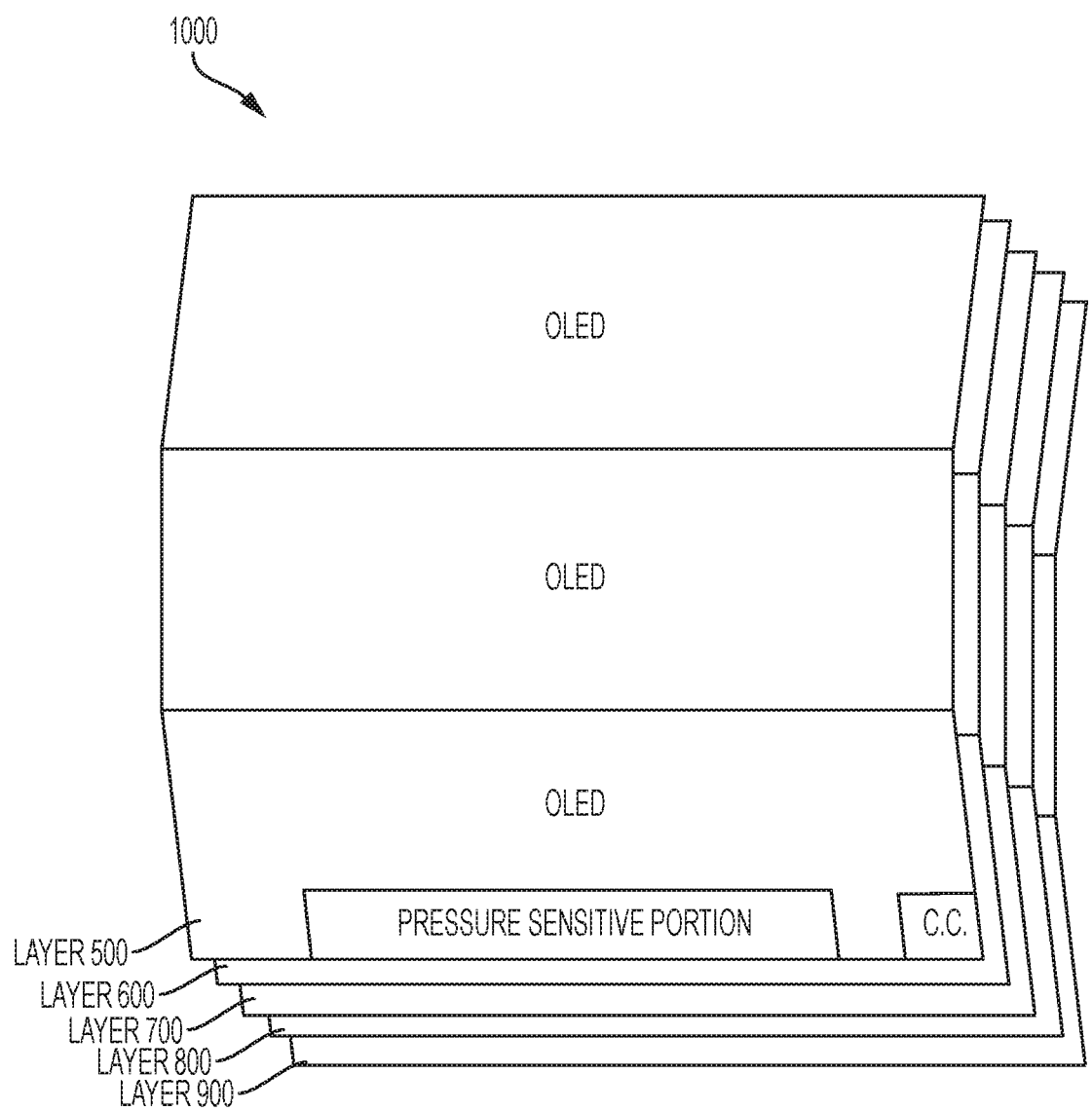
FIG. 10 shows an illustrative layered view of an OLED-based foldable display.

FIG. 10 shows illustrative layers 500-900 (shown and described in FIGS. 5-9), stacked in an illustrative manner within illustrative OLED-based display 1000. It should be appreciated that layers 500-900 may be stacked in any other suitable manner than that shown in FIG. 10. It should also be appreciated that not every layer may be necessary in every OLED-based display. Connections may exist between the components and/or layers of display 1000. For example, there may be wiring, circuitry or any other suitable connection to link together components of OLED-based display 1000.

Figure 11A:
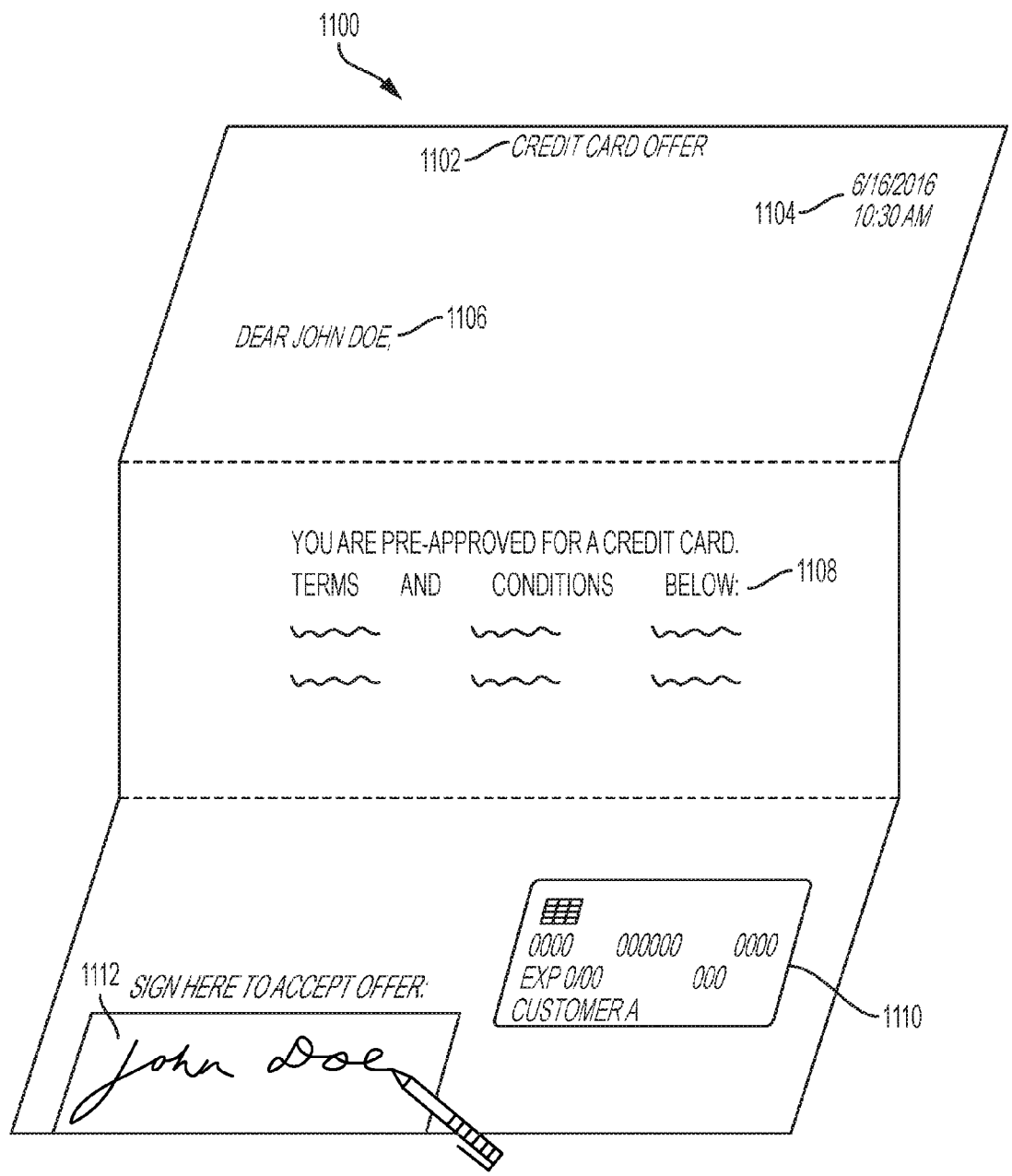
FIGS. 11A-C show several states of an illustrative OLED-based foldable display.
Figure 11B:
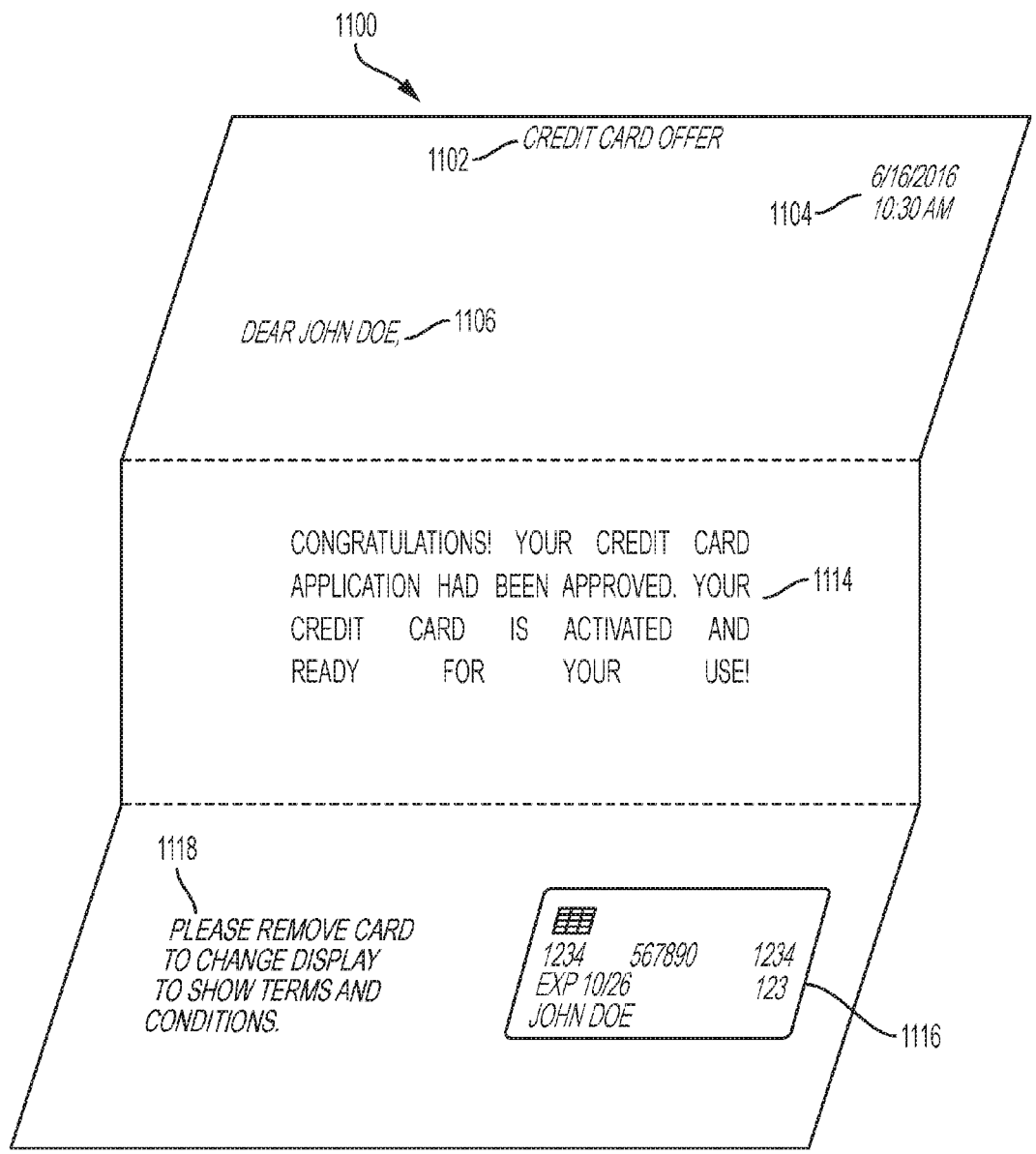
Figure 11C:
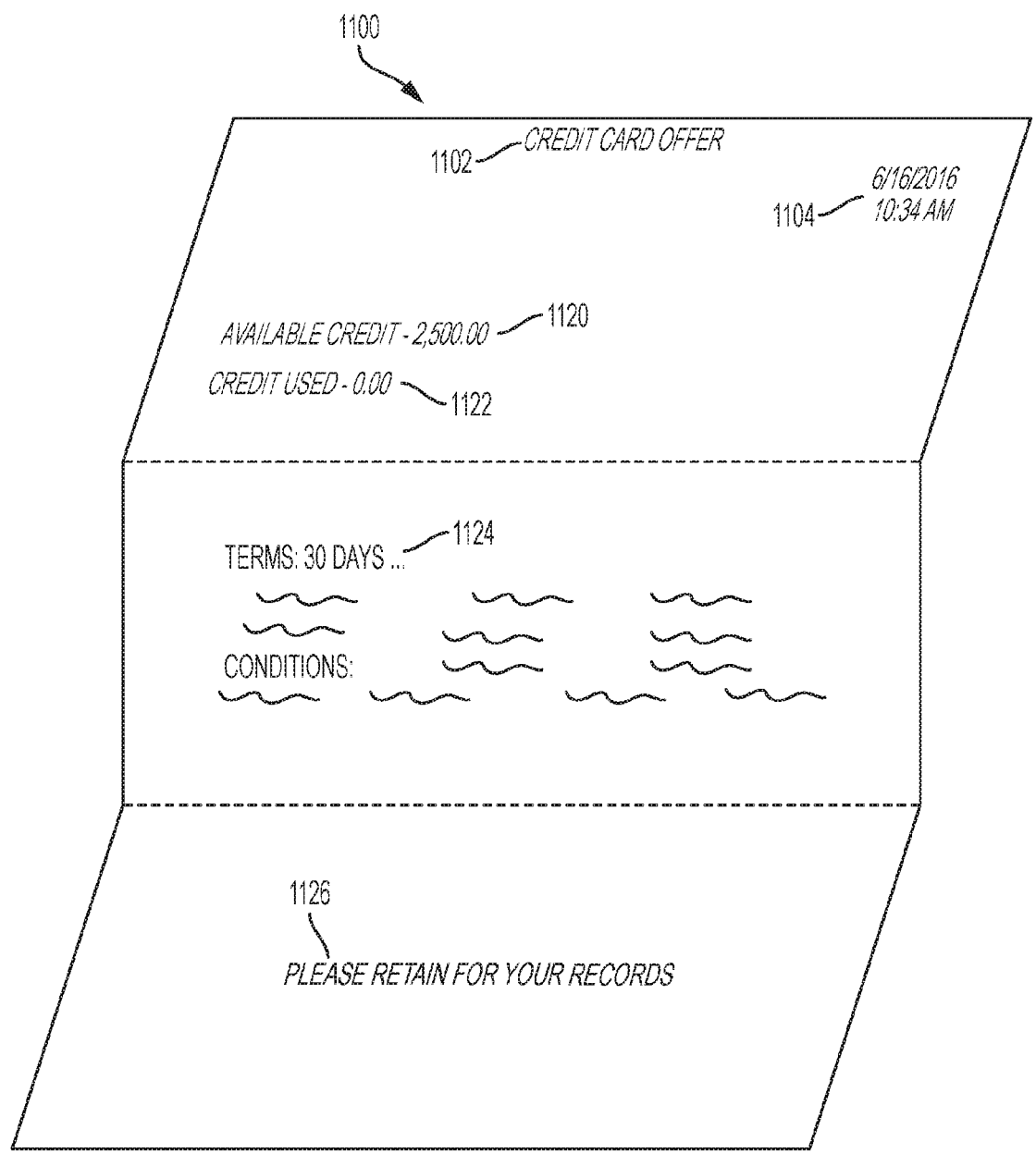

FIGS. 11A-C show several states of illustrative OLED-based display 1100.

FIG. 11A shows that OLED-based display 1100 may be a credit card offer, as shown at 1102. OLED-based display 1100 may have been mailed and addressed to potential customer "John Doe", as shown at 1106. The current date and time may be displayed, as shown at 1104. Text 1108 may inform potential customer "John Doe" that he is pre-approved for a credit card. Text 1108 may also inform potential customer "John Doe" of the terms and conditions of the credit card.

In the event that customer "John Doe" decides to accept the credit card offer, he may sign at box 1112. Box 1112 may be a pressure-sensitive portion configured to accept a signature. Card blank 1110 may be affixed to document. Card blank 1110 may be a smart card, as described earlier.

Upon signing document 1100, a pixelated image of the signature may be transmitted to a secure entity hub. The secure entity hub may save the signature and transmit an approval notification to document 1100. Document 1100 may display the approval notification, as shown at 1114 in FIG. 11B. The secure entity hub may also transmit card blank information to document 1100. Document 1100 may transmit the card blank information to card blank 1116. Card blank 1116 may display the received card blank information.

Text 1118 may inform the customer to remove the card to change the display of the document to show terms and conditions.

Once the card is removed, the display may change, as shown in FIG. 11C. FIG. 11C shows available credit 1120, credit used 1122 and terms and conditions 1124. Document 1100 instructs the customer to retain the document, as shown at 1126. Document 1100 may retain the text shown in order for a user to view the displayed text at a later time.

Figure 12A:
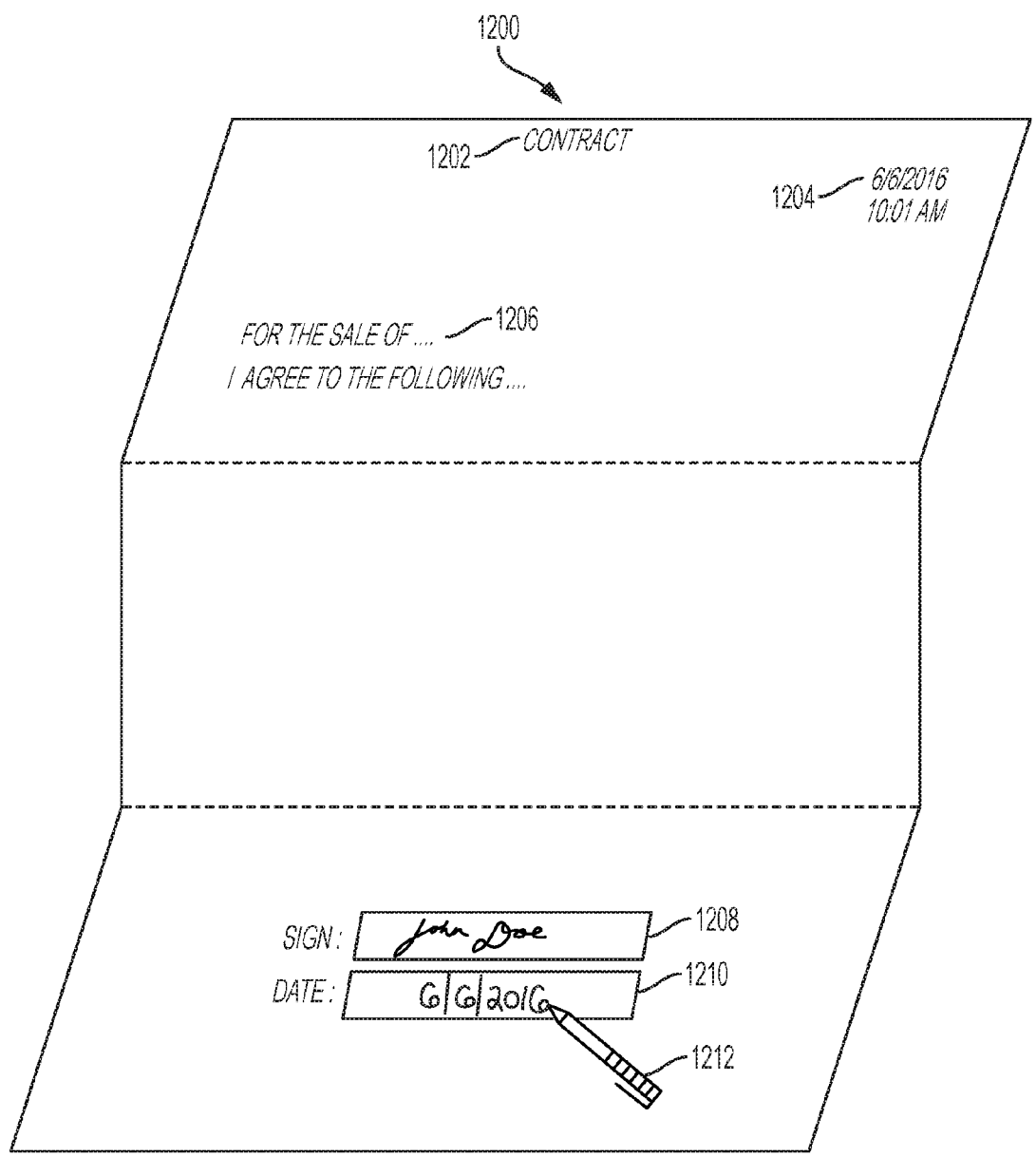
FIGS. 12A-B show several states of another illustrative OLED-based foldable display.
Figure 12B:
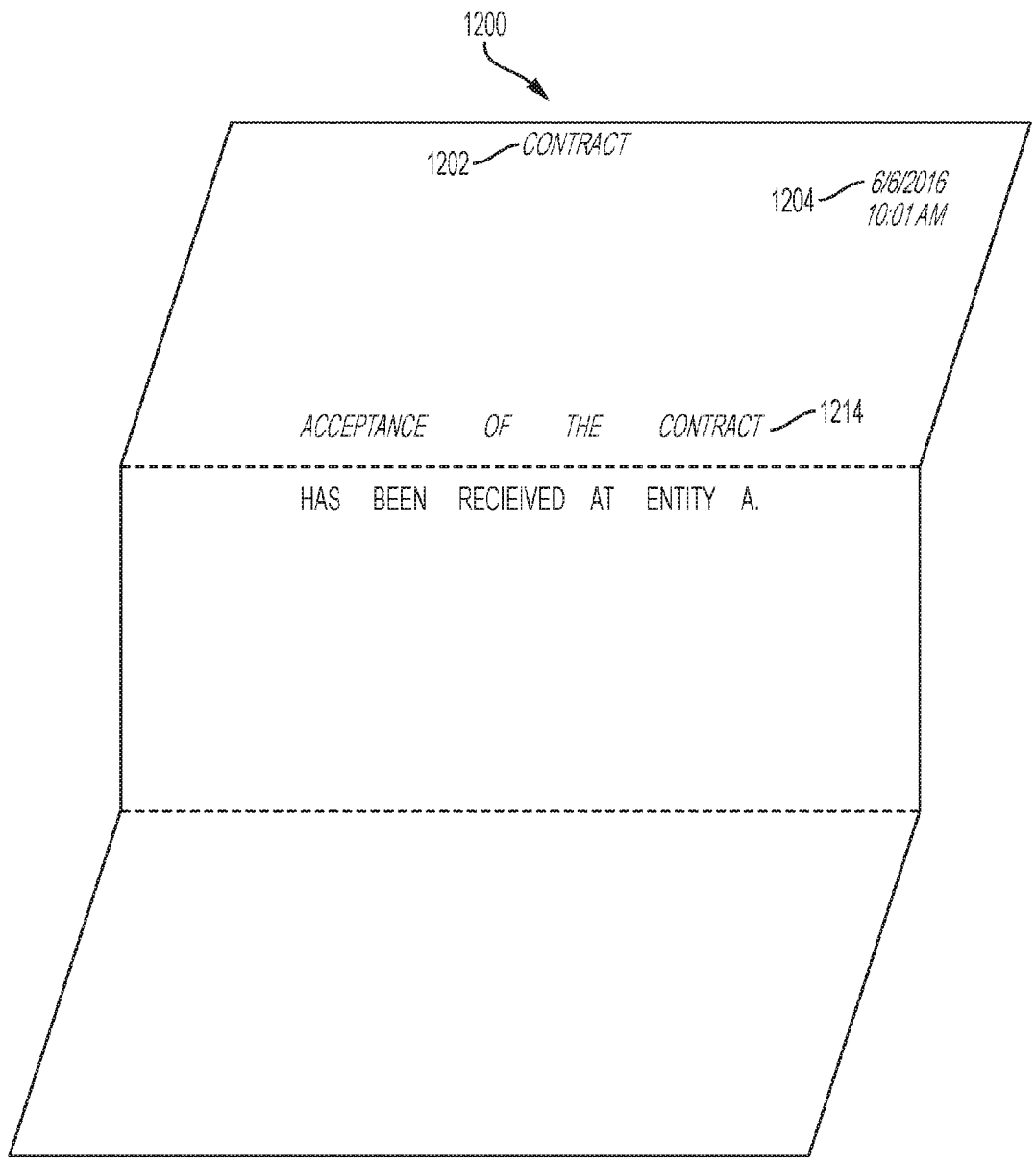

FIG. 12A-B show several states of illustrative OLED-based document 1200. Document 1200 may be a contract, as shown at 1202. Document 1200 may display the date and time, as shown at 1204. Document 1200 may include agreement information, as shown at 1206.

A user may be able to sign the document at pressure-sensitive portion 1208 and date the document at pressure-sensitive portion 1210, using pen or stylus 1212. Document 1200 may transmit a pixelated image of the signature and a pixelated image of the date to entity A. Entity A may transmit an acceptance notification to display 1200. Display 1200 may display the acceptance notification, as shown at 1214 in FIG. 12B.

In some embodiments, entity A may mail, email or fax a hard copy of the contract with the pixelated images to the customer in order for the customer to retain a copy of the contract. In other embodiments, display 1200 may display the signed contract. The customer may then save the signed contract for safekeeping.

Figure 13A:
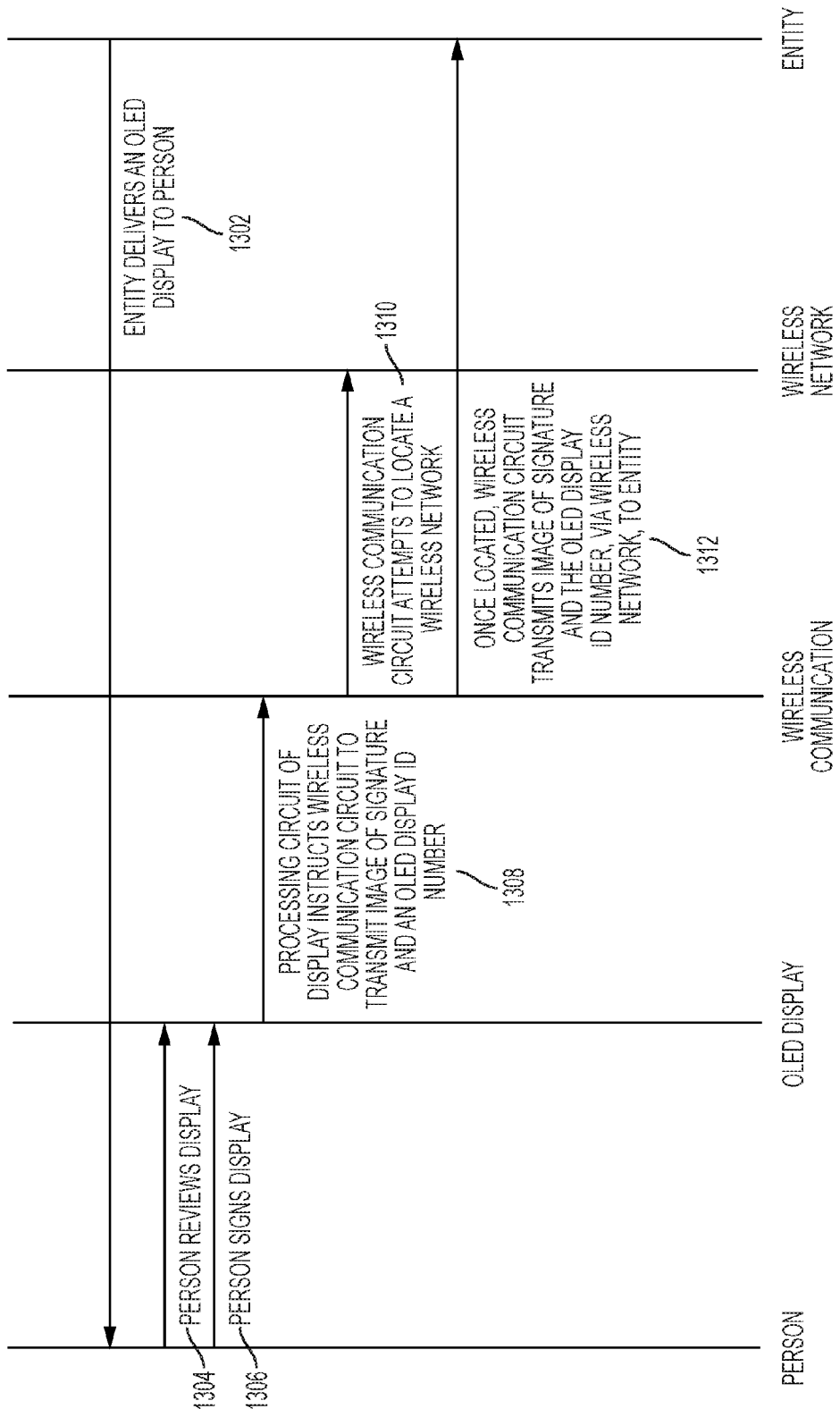
FIGS. 13A-B show an illustrative flow chart in accordance with principles of the invention.
Figure 13B:
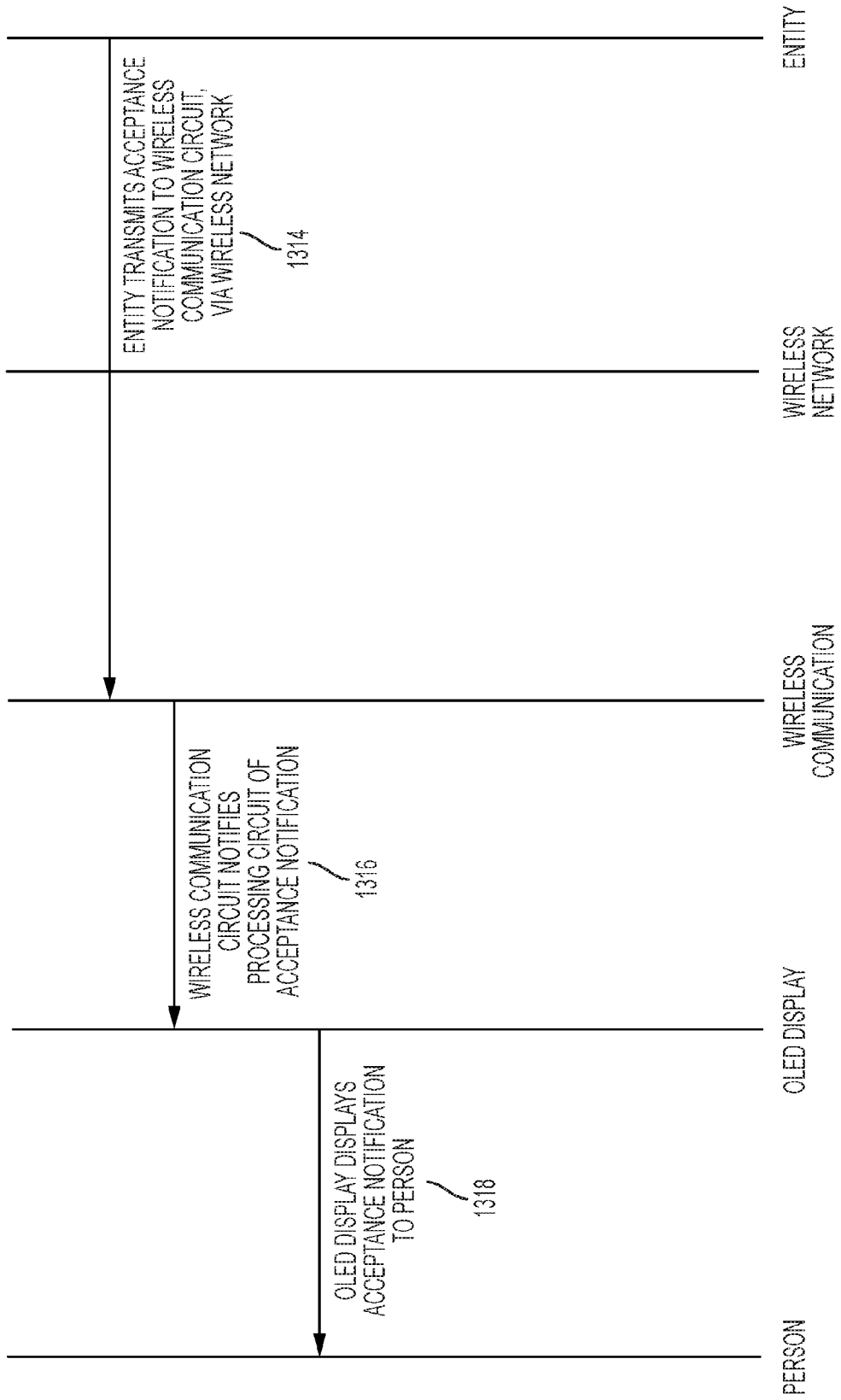

FIGS. 13A-B shows a flow chart of communications between a person, OLED display, wireless communication circuit, wireless network and entity. Step 1302 shows an entity deliver an OLED display to a person. Step 1304 shows the person review the display. Step 1306 shows the person signs the display. Step 1308 shows the processing circuit, included in the display, instruct the wireless communication circuit, also included in the display, to transmit an image of the signature and an OLED display ID number. Step 1310 shows wireless communication circuit attempts to locate a wireless network. Step 1312 shows that, once located, wireless communication circuit transmits the image of the signature and the OLED display ID number to entity via wireless network.

Figure 14A:
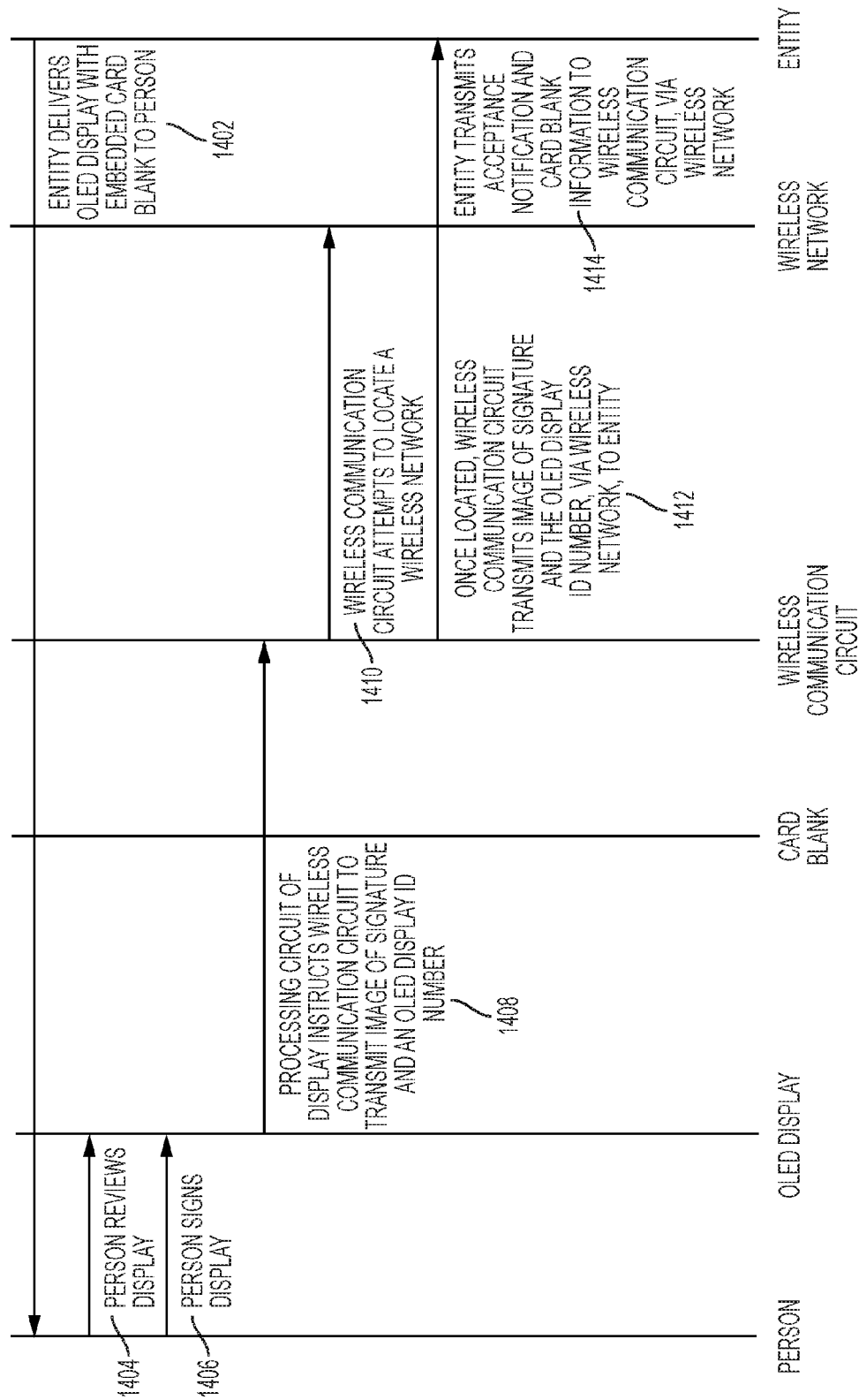
FIGS. 14A-B show another illustrative flow chart in accordance with principles of the invention.
Figure 14B:
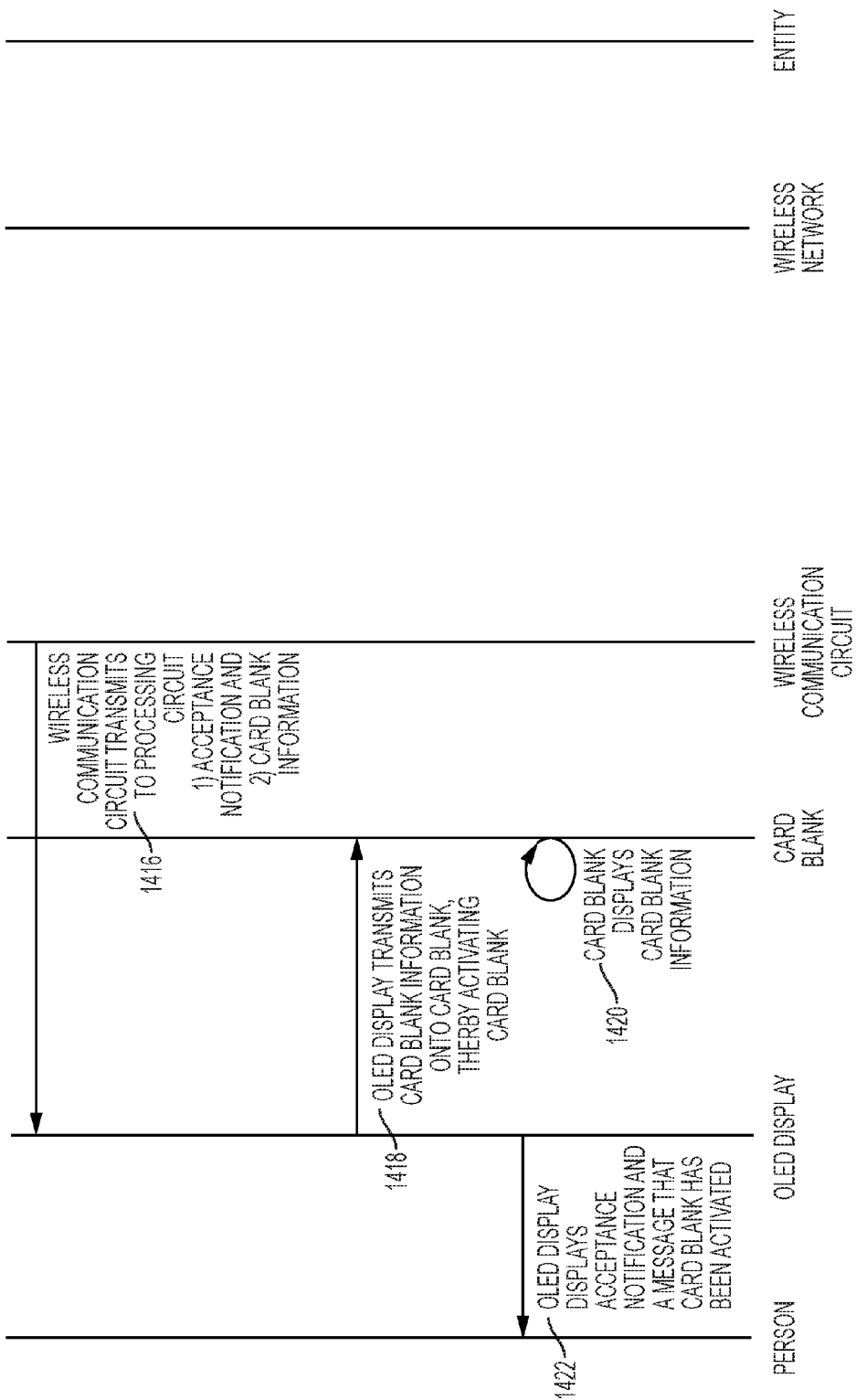

FIGS. 14A-B shows exemplary communications between a person, OLED display, card blank, wireless communication circuit, wireless network and an entity. Step 1402 shows entity delivers OLED display with embedded card blank to person. Step 1404 shows person reviews display. Step 1406 shows person signs display. Step 1408 shows processing circuit of display instructs wireless communication circuit to transmit an image of the signature and an OLED display ID number. Step 1410 shows wireless communication circuit attempts to locate a wireless network. Step 1412 shows that once located, wireless communication circuit transmits the image of the signature and the OLED display ID number, via wireless network to entity.

Step 1414 shows the entity transmits acceptance notification and card blank information to wireless communication circuit via wireless network. Step 1416 shows wireless communication circuit transmits acceptance notification and card blank information to processing circuit. Step 1418 shows OLED display transmits card blank information onto card blank, thereby activating the card blank. Step 1420 shows card blank displays card blank information. Step 1422 shows OLED display displays acceptance notification and a message that the card blank has been activated.

Step 1314 shows entity transmits an acceptance notification to wireless communication circuit, via wireless network. Step 1316 shows wireless communication circuit notifies processing circuit of acceptance notification. Step 1318 shows OLED display displays acceptance notification to a person.

Thus, methods and apparatus for OLED-based displays are provided. Persons skilled in the art will appreciate that the present invention can be practiced by other than the described embodiments, which are presented for purposes of illustration rather than of limitation, and that the present invention is limited only by the claims that follow.

What is claimed is:

1. An OLED foldable display comprising:
    an array of organic light emitting diodes ("OLEDs") forming the display, at least a portion of the array of OLEDs having a surface area that is at least 25% of 8.5 inches by 11 inches and having a pressure-sensitive portion that is configured to capture a handwritten signatures;
    a wireless communication circuit;
    a processor circuit comprising a non-transitory memory and a processor;
    a battery for powering the OLED display, the pressure-sensitive portion, the wireless communication circuit and the processor circuit;
    wherein, in operation, the processor circuit is configured to control the OLED display, the pressure-sensitive portion and the wireless communication circuit by:
        receiving a handwriting signature on the pressure-sensitive portion;
        storing the handwritten signature in the non-transitory memory as a pixelated image;
        storing a date time value of the receipt time of the signature in the non-transitory memory;
        scanning, via the communication circuit, for a wireless communication network; and
        upon detecting a wireless communication network, transmitting, over the wireless communication network, the pixelated image, the date time value and an identification number associated with the display, to a secure entity hub;
    wherein the processor circuit is further configured to receive a packet from the secure entity hub, the packet comprising the identification number and an acceptance of the handwritten signature.

2. The OLED foldable display of claim 1, wherein, upon receipt of the acceptance of the handwritten signature, the processor circuit is further configured to control the OLED display and imprint the handwritten signature and information displayed on the display onto a substrate that backs the OLED-based display.

3. The OLED foldable display of claim 2, wherein the substrate is paper.

4. An OLED foldable display comprising:
    an array of organic light emitting diodes ("OLEDs") forming the display, at least a portion of the array of OLEDs having a surface area that is at least 25% of 8.5 inches by 11 inches and having a pressure-sensitive portion that is configured to capture a handwritten signature;
    a wireless communication circuit;
    a processor circuit comprising a non-transitory memory and a processor;
    a battery for powering the OLED display, the pressure-sensitive portion, the wireless communication circuit and the processor circuit;

wherein, in operation, the processor circuit is configured to control the OLED display, the pressure-sensitive portion and the wireless communication circuit by:
receiving a handwritten signature on the pressure-sensitive portion;
storing the handwritten signature in the non-transitory memory as a pixelated image;
storing a date time value of the receipt time of the signature in the non-transitory memory;
scanning, via the communication circuit, for a wireless communication network; and
upon detecting a wireless communication network, transmitting, over the wireless communication network, the pixelated image, the date value and an identification number associated with the display, to a secure entity hub;
wherein the processor circuit is further configured to control the OLED display by receiving a packet from the secure entity hub, the packet comprising the identification number and a denial of the handwritten signature.

5. An OLED foldable display comprising:
an array of organic light emitting diodes ("OLEDs") forming the display, at least a portion of the array of OLEDs having a surface area that is at least 25% of 8.5 inches by 11 inches and having a pressure-sensitive portion that is configured to capture a handwritten signature:
a wireless communication circuit;
a processor circuit comprising a non-transitory memory and a processor;
a battery for powering the OLED display, the pressure-sensitive portion, the wireless communication circuit and the processor circuit;
wherein, in operation, the processor circuit is configured to control the OLED display, the pressure-sensitive portion and the wireless communication circuit by:
receiving a handwritten signature on the pressure-sensitive portion;
storing the handwritten signature in the non-transitory memory as a pixelated image;
storing a date time value of the receipt time of the signature in the non-transitory memory;
scanning, via the communication circuit, for a wireless communication network; and
upon detecting a wireless communication network, transmitting, over the wireless communication network, the pixelated image, the date time value and an identification number associated with the display, to a secure entity hub;
wherein when the wireless communication circuit detects a credit card, bank card or debit card within a distance accessible by near field communication of the display, the wireless communication circuit is configured to communicate with the credit card, bank card or debit and attempt to retrieve information from the credit card, bank card or debit card.

6. The OLED foldable display of claim 5, wherein:
the wireless communication circuit is configured to transmit the retrieved information to the secure entity hub;
the wireless communication circuit is configured to receive personalized OLED display information from the secure entity hub; and
the processor circuit is configured to cause the OLED display to display the personalized OLED display information.

7. An OLED foldable display comprising:
an array of organic light emitting diodes ("OLEDs") forming the display, at least a portion of the array of OLEDs having a surface area that is at least 25% of 8.5 inches by 11 inches and having a pressure-sensitive portion that is configured to capture a handwritten signature;
a wireless communication circuit;
a processor circuit comprising a non-transitory memory and a processor;
a battery for powering the OLED display, the pressure-sensitive portion, the wireless communication circuit and the processor circuit;
wherein, in operation, the processor circuit is configured to control the OLED display, the pressure-sensitive portion and the wireless communication circuit by;
receiving a handwritten signature on the pressure-sensitive portion;
storing the handwritten signature in the non-transitory memory as a pixelated image;
storing a date time value of the receipt time of the signature in the non-transitory memory;
scanning, via the communication circuit, for a wireless communication network; and
upon detecting a wireless communication network, transmitting, over the wireless communication network, the pixelated image, the date time value and an identification number associated with the display, to a secure entity hub; and
a card blank temporarily fastened to the display;
wherein the processor circuit is further configured to control the OLED display by:
receiving card identification information from a contactless communications chip;
transmitting the card identification information to the secure entity hub;
receiving a packet from the secure entity hub, the packet comprising the identification number, an acceptance of the handwritten signature and information for activating/validating the card blank;
activating the card blank with the received information;
displaying the received information on the face of the card blank; and
transmitting a second packet to the secure entity hub comprising the identification number and a message that the card blank has been activated.

8. The OLED foldable display of claim 7, wherein the first time a user utilizes the card blank in a card terminal, the user is required to utilize the contactless communications chip as identification in order to use the card blank.

9. An OLED foldable display comprising:
an array of organic light emitting diodes ("OLEDs") forming the display, at least a portion of the array of OLEDs having a surface area that is at least 25% of 8.5 inches by 11 inches and having a pressure-sensitive portion that is configured to capture a handwritten signature;
a wireless communication circuit;
a processor circuit comprising a non-transitory memory and a processor;
a battery for powering the OLED display, the pressure-sensitive portion, the wireless communication circuit and the processor circuit;
wherein, in operation, the processor circuit is configured to control the OLED display, the pressure-sensitive portion and the wireless communication circuit by;
receiving a handwritten signature on the pressure-sensitive portion;

storing the handwritten signature in the non-transitory memory as a pixelated image;

storing a date time value of the receipt time of the signature in the non-transitory memory;

scanning, via the communication circuit, for a wireless communication network; and upon detecting a wireless communication network, transmitting, over the wireless communication network, the pixelated image, the date time value and an identification number associated with the display, to a secure entity hub; and a card embedded in the display, the card attached to the display with perforated connections, said perforated connections connecting the display to electronics in the card;

wherein the processor circuit is further configured to control the OLED display by:

receiving card identification information from a contactless EMV chip card;

transmitting the card identification information to the secure entity hub;

receiving a packet from the secure entity hub, the packet comprising the identification number, an acceptance of the handwritten signature and card blank information;

activating the card blank with the card blank information; and transmitting a second packet to the secure entity hub comprising the identification number and a message that the card has been activated.

10. An OLED foldable display comprising:

an array of organic light emitting diodes ("OLEDs") forming the display least a portion of the array of OLEDs having a thickness that is not greater than 0.25 mm, having a surface area that is at least 80% of 8.5 inches by 11 inches, having, a pressure-sensitive portion that is configured to capture a handwritten signature, the display being foldable in a trifold manner, the display, when trifolded, being sized to fit a #10 envelope;

a wireless communication circuit having a thickness that is not greater than 0.8 mm;

a processor circuit comprising memory and a processor, the processor circuit having a thickness no greater than 0.25 mm;

a solar powered battery circuit for powering the OLED display, the pressure-sensitive portion, the wireless communication circuit and the processor circuit, the battery having a thickness no greater than 0.5 mm;

wherein, in operation, the processor circuit is configured to control the OLED display, the pressure-sensitive portion and the wireless communication circuit by:

receiving a handwritten signature on the pressure-sensitive portion;

storing the handwritten signature in the non-transitory memory as a pixelated image;

storing a date time value of the receipt time of the signature in the non-transitory memory;

scanning, via the communication circuit, for a wireless communication network; and upon detecting a wireless communication network, transmitting, over the wireless communication network, the pixelated image, the date time value and an identification number associated with the display, to a secure entity hub;

wherein the processor circuit is further configured to receive a packet from the secure entity hub, the packet comprising the identification number and an acceptance of the handwritten signature.

11. The OLED foldable display of claim 10, wherein, upon receipt of the acceptance of the handwritten signature, the processor circuit is further configured to control the OLED display and imprint the handwritten signature and information displayed on the display onto a substrate that backs the OLED-based display.

12. The OLED foldable display of claim 11, wherein the substrate is paper.

13. An OLED foldable display comprising:

an array of organic light emitting diodes ("OLEDs") forming the display, at least a portion of the array of OLEDs having a thickness that is not greater than 0.25 mm, having a surface area that is at least 80% of 8.5 inches by 11 inches, having a pressure-sensitive portion that is configured to capture a handwritten signature, the display being foldable in a trifold manner, the display, when trifolded, being sized to fit a #10 envelope;

a wireless communication circuit having a thickness that is not greater than 0.8 mm;

a processor circuit comprising a non-transitory memory and a processor, the processor circuit having a thickness no greater than 0.25 mm;

a solar-powered battery circuit for powering the OLED display, the pressure-sensitive portion, the wireless communication circuit and the processor circuit, the battery having a thickness no greater than 0.5 mm;

wherein, in operation, the processor circuit is configured to control the OLED display, the pressure-sensitive portion and the wireless communication circuit by:

receiving a handwritten signature on the pressure-sensitive portion;

storing the handwritten signature in the non-transitory memory as a pixelated image;

storing a date time value of the receipt time of the signature in the non-transitory memory;

scanning, via the communication circuit, for a wireless communication network; and upon detecting a wireless communication network, transmitting, over the wireless communication network, the pixelated image, the date time value and an identification number associated with the display, to a secure entity hub;

wherein the processor circuit is further configured to control the OLED display by receiving a packet from the secure entity hub, the packet comprising the identification number and a denial of the handwritten signature.

14. An OLED foldable display comprising:

an array of organic light emitting diodes ("OLEDs") forming the display, at least a portion of the array of OLEDs having a thickness that is not greater than 0.25 mm, having a surface area that is at least 80% of 8.5 inches by 11 inches, having a pressure-sensitive portion that is configured to capture a handwritten signature, the display being foldable in a trifold manner, the display, when trifolded, being sized to fit a #10 envelope;

a wireless communication circuit having a thickness that is not greater than 0.8 mm;

a processor circuit comprising a non-transitory memory and a processor, the processor circuit having a thickness no greater than 0.25 mm;

a solar-powered battery circuit for powering the OLED display, the pressure-sensitive portion, the wireless communication circuit and the processor circuit, the battery having a thickness no greater than 0.5 mm;

wherein, in operation, the processor circuit is configured to control the OLED display, the pressure-sensitive portion and the wireless communication circuit by:
  receiving a handwritten signature on the pressure-sensitive portion;
  storing the handwritten signature in the non-transitory memory as a pixelated image;
  storing a date time value of the receipt time of the signature in the non-transitory memory;
  scanning, via the communication circuit, for a wireless communication network; and
  upon detecting a wireless communication network, transmitting, over the wireless communication network, the pixelated image, the date time value and an identification number associated with the display, to a secure entity hub;

wherein when the wireless communication circuit detects a credit card, bank card or debit card within a distance accessible by near field communication of the display, the wireless communication circuit is configured to communicate with the credit card, bank card or debit and attempt to retrieve information from the credit card, bank card or debit card.

15. The OLED foldable display of claim 14, wherein:

the wireless communication circuit is configured to transmit the retrieved information to the secure entity hub;

the wireless communication circuit is configured to receive personalized OLED display information from the secure entity hub; and the processor circuit is configured to cause the OLED display to display the personalized OLED display information.

16. An OLED foldable display comprising:

an array of organic light emitting diodes ("OLEDs") forming the display, at least a portion of the array of OLEDs having a thickness that is not greater than 0.25 mm, having a surface area that is at least 80% of 8.5 inches by 11 inches, having a pressure-sensitive portion that is configured to capture a handwritten signature, the display being foldable in a trifold manner, the display, when trifolded, being sized to fit a #10 envelope;

a wireless communication circuit having a thickness that is not greater than 0.8 mm;

a processor circuit comprising a non-transitory memory and a processor, the processor circuit having a thickness no greater than 0.25 mm;

a solar powered battery circuit for powering the OLED display, the pressure-sensitive portion, the wireless communication circuit and the processor circuit, the battery having a thickness no greater than 0.5 mm; and wherein, in operation, the processor circuit is configured to control the OLED display, the pressure-sensitive portion and the wireless communication circuit by:
  receiving a handwritten signature on the pressure-sensitive portion;
  storing the handwritten signature in the non-transitory memory as a pixelated image;
  storing a date time value of the receipt time of the signature in the non-transitory memory;
  scanning, via the communication circuit, for a wireless communication network; and
  upon detecting a wireless communication network, transmitting, over the wireless communication network, the pixelated image, the date time value and an identification number associated with the display, to a secure entity hub;

a card blank temporarily fastened to the display;

wherein the processor circuit is further configured to control the OLED display by:
  receiving card identification information from a contactless communications chip;
  transmitting the card identification information to the secure entity hub;
  receiving a packet from the secure entity hub, the packet comprising the identification number, an acceptance of the handwritten signature and card blank information;
  activating the card blank with the card blank information; and
  transmitting a second packet to the secure entity hub comprising the identification number and a message that the card blank has been activated.

17. The OLED foldable display of claim 16, wherein the first time a user utilizes the card blank in a card terminal, the user is required to utilize the contactless communications chip as identification in order to use the card blank.

18. An OLED foldable display comprising:

an array of organic light emitting diodes ("OLEDs") forming the display, at least a portion of the array of OLEDs having a thickness that is not greater than 0.25 mm, having a surface area that is at least 80% of 8.5 inches by 11 inches, having a pressure-sensitive portion that is configured to capture a handwritten signature, the display being foldable in a trifold manner, the display, when trifolded, being sized to fit a #10 envelope;

a wireless communication circuit having a thickness that is not greater than 0.8 mm;

a processor circuit comprising a non-transitory memory and a processor, the processor circuit having a thickness no greater than 0.25 mm;

a solar powered battery circuit for powering the OLED display, the pressure-sensitive portion, the wireless communication circuit and the processor circuit, the battery having a thickness no greater than 0.5 mm; and wherein, in operation, the processor circuit is configured to control the OLED display, the pressure-sensitive portion and the wireless communication circuit by:
  receiving a handwritten signature on the pressure-sensitive portion;
  storing the handwritten signature in the non-transitory memory as a pixelated image;
  storing a date time value of the receipt time of the signature in the non-transitory memory;
  scanning, via the communication circuit, for a wireless communication network; and
  upon detecting a wireless communication network, transmitting, over the wireless communication network, the pixelated image, the date time value and an identification number associated with the display, to a secure entity hub;

a card embedded in the display, the card attached to the display with perforated connections, said perforated connections connecting the display to electronics in the card;

wherein the processor circuit is further configured to control the OLED display by:
  receiving card identification information from a contactless EMV chip card;

transmitting the card identification information to the secure entity hub;

receiving a packet from the secure entity hub, the packet comprising the identification number, an acceptance of the handwritten signature and card blank information;

activating the card blank with the card blank information; and transmitting a second packet to the secure entity hub comprising the identification number and a message that the card blank has been activated.

19. An OLED foldable display comprising:

an array of organic light emitting diodes ("OLEDs") forming the display, at least a portion of the array of OLEDs having a thickness that is not greater than 0.25 mm, having a surface area that is at least 80% of 8.5 inches by 11 inches, having a pressure-sensitive portion that is configured to capture a handwritten signature, the display being foldable in a trifold manner, the display, when trifolded, being sized to fit a #10 envelope;

a wireless communication circuit having a thickness that is not greater than 0.8 mm;

a processor circuit comprising a non-transitory memory and a processor, the processor circuit having a thickness no greater than 0.25 mm;

a solar powered battery circuit for powering the OLED display, the pressure-sensitive portion, the wireless communication circuit and the processor circuit, the battery having a thickness no greater than 0.5 mm;

wherein, in operation, the processor circuit is configured to control the OLED display, the pressure-sensitive portion and the wireless communication circuit by:

receiving a handwritten signature on the pressure-sensitive portion;

storing the handwritten signature in the non-transitory memory as a pixelated image;

storing a date time value of the receipt time of the signature in the non-transitory memory;

scanning, via the communication circuit, for a wireless communication network; and upon detecting a wireless communication network, transmitting, over the wireless communication network, the pixelated image, the date time value and an identification number associated with the display, to a secure entity hub;

wherein:

the OLED display further comprises a second pressure-sensitive portion configured to capture a person's biometric characteristic;

the received biometric characteristic is transferred into an array of bytes on the non-transitory memory; and the array of bytes on the non-transitory memory is transmitted to the secure entity hub together with the pixelated image.

20. A OLED foldable display comprising:

an array of organic light emitting diodes ("OLEDs") forming the display, at least a portion of the array of OLEDs having a thickness that is not greater than 0.25 mm, having a surface area that is at least 80% of 8.5 inches by 11 inches, having a pressure-sensitive portion that is configured to capture a handwritten signature, the display being foldable in a trifold manner, the display, when trifolded, being sized to fit a #10 envelope;

a wireless communication circuit having a thickness that is not greater than 0.8 mm;

a processor circuit comprising a non-transitory memory and a processor, the processor circuit having a thickness no greater than 0.25 mm;

a solar powered battery circuit for powering the OLED display, the pressure-sensitive portion, the wireless communication circuit and the processor circuit, the battery having a thickness no greater than 0.5 mm;

wherein, in operation, the processor circuit is configured to control the OLED display, the pressure-sensitive portion and the wireless communication circuit by:

receiving a handwritten signature on the pressure-sensitive portion;

storing the handwritten signature in the non-transitory memory as a pixelated image;

storing a date time value of the receipt time of the signature in the non-transitory memory;

scanning, via the communication circuit, for a wireless communication network; and upon detecting a wireless communication network, transmitting, over the wireless communication network, the pixelated image, the date time value and an identification number associated with the display, to a secure entity hub;

wherein:

the OLED display further comprises a camera configured to capture a person's biometric characteristics; and the received biometric characteristic is transferred into an array of bytes on the non-transitory memory;

the array of bytes on the non-transitory memory is transmitted to the secure entity hub together with the pixelated image.

\* \* \* \* \*